US012213111B2

(12) United States Patent
Liu et al.

(10) Patent No.: US 12,213,111 B2
(45) Date of Patent: Jan. 28, 2025

(54) RESOURCE MULTIPLEXING METHOD AND APPARATUS

(71) Applicant: Huawei Technologies Co., Ltd., Shenzhen (CN)

(72) Inventors: Fengwei Liu, Chengdu (CN); Shitong Yuan, Chengdu (CN); Jing Qiu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 345 days.

(21) Appl. No.: 17/672,095

(22) Filed: Feb. 15, 2022

(65) Prior Publication Data

US 2022/0174670 A1 Jun. 2, 2022

Related U.S. Application Data

(63) Continuation of application No. PCT/CN2020/109629, filed on Aug. 17, 2020.

(30) Foreign Application Priority Data

Aug. 16, 2019 (CN) .......................... 201910760301.7

(51) Int. Cl.
*H04W 56/00* (2009.01)
*H04W 72/0446* (2023.01)
(52) U.S. Cl.
CPC .............................. *H04W 72/0446* (2013.01)
(58) Field of Classification Search
CPC ................................................ H04W 72/0446
USPC ........................................................ 370/329
See application file for complete search history.

(56) References Cited

U.S. PATENT DOCUMENTS

| 10,057,389 | B2 | 8/2018 | Fechtel |
| 10,735,090 | B2 | 8/2020 | Zheng et al. |
| 10,742,465 | B2 | 8/2020 | Yamada et al. |
| 11,838,151 | B1 * | 12/2023 | Jones .................. H04L 25/0224 |

(Continued)

FOREIGN PATENT DOCUMENTS

| CN | 102045843 A | 5/2011 |
| CN | 102055518 A | 5/2011 |

(Continued)

OTHER PUBLICATIONS

Huawei et al., "On frame structure in IAB", 3GPP TSG RAN WG1 Meeting #95, Spokane, USA, Nov. 12-16, 2018, R1-1812200, 6 pages.

(Continued)

*Primary Examiner* — Sai Ming Chan
(74) *Attorney, Agent, or Firm* — Slater Matsil, LLP

(57) ABSTRACT

A resource multiplexing method and apparatus are provided, to determine a set of available symbols in an NR IAB system. A first node determines a time domain position of a DU resource of a communications device, and determines a time domain position of an MT resource of the communications device based on the time domain position and a type of the DU resource and guard interval information. Alternatively, a first node determines a time domain position of an MT resource of a communications device, and determines a time domain position of a DU resource of the communications device based on the time domain position and a type of the MT resource and guard interval information.

20 Claims, 26 Drawing Sheets

(56) References Cited

U.S. PATENT DOCUMENTS

| | | | |
|---|---|---|---|
| 2006/0148414 A1* | 7/2006 | Tee | H04B 17/336 455/69 |
| 2012/0069793 A1 | 3/2012 | Chung et al. | |
| 2018/0110050 A1 | 4/2018 | Liu et al. | |
| 2019/0014576 A1* | 1/2019 | Liao | H04W 72/0446 |
| 2020/0015316 A1* | 1/2020 | Islam | H04W 56/0045 |
| 2020/0295865 A1 | 9/2020 | Yang et al. | |
| 2021/0368481 A1* | 11/2021 | Jo | H04W 72/21 |
| 2022/0116950 A1* | 4/2022 | Zhao | H04L 5/0094 |
| 2022/0353026 A1* | 11/2022 | Yeo | H04L 1/1854 |

FOREIGN PATENT DOCUMENTS

| | | |
|---|---|---|
| CN | 105122755 A | 12/2015 |
| CN | 107615848 A | 1/2018 |
| CN | 108353054 A | 7/2018 |
| CN | 109155740 A | 1/2019 |
| JP | 2013026751 A | 2/2013 |
| JP | 2018506895 A | 3/2018 |
| WO | 2016047994 A1 | 3/2016 |

OTHER PUBLICATIONS

Nokia et al., "Open items with IAB Case #1 timing", 3GPP TSG RAN WG1#97, Reno, USA, May 13-17, 2019, R1-1907117, 5 pages.

3GPP TS 38.213 V15.6.0 (Jun. 2019), "3rd Generation Partnership Project; Technical Specification Group Radio Access Network; NR; Physical layer procedures for control", (Release 15), 107 pages.

Huawei et al., "Resource multiplexing between backhaul and access in IAB", 3GPP TSG RAN WG1 Meeting #97, Reno, USA, May 13-17, 2019, R1-1906001, 9 pages.

Zte et al., Summary of 7.2.3.4 "Mechanism to support the "case-1" OTA timing alignment", 3GPP TSG RAN WG1 Meeting #97 , Reno, USA, May 13-17, 2019, R1-1907667, 15 pages.

3GPP TS 38.321 V15.6.0 (Jun. 2019), "3rd Generation Partnership Project; Technical Specification Group Radio Access Network; NR; Medium Access Control (MAC) protocol specification", (Release 15), 78 pages.

Intel Corporation, "Mechanisms to Support the Case #1 OTA Timing Alignment", 3GPP TSG RAN WG1 #97, May 13-17, 2019, Reno, USA, R1-1906793, 4 pages.

Zte et al., "Discussion on OTA timing mechanism", 3GPP TSG RAN WG1 Meeting #97, Reno, USA, May 13-17, 2019, R1-1906456, 5 pages.

Huawei et al., "DL transmission timing alignment for IAB", 3GPP TSG RAN WG1 Meeting #96bis, Xi'an, China, Apr. 8-12, 2019, R1-1903939, 6 pages.

NEC, Discussion on IAB. 3GPP TSG RAN WG1 #96bis, Xi an, China, Apr. 8-12, 2019, R1-1904661, 2 pages.

Huawei, HiSilicon, DL transmission timing alignment for IAB. 3GPP TSG RAN WG1 Meeting #97, Reno, USA, May 13- 17, 2019, R1-1906002, 6 pages.

Asustek, Discussion on Timing Alignment for IAB nodes. 3GPP TSG RAN WG1 Meeting #94, Gothenburg, Sweden, Aug. 20-24, 2018, R1-1809250, 4 pages.

* cited by examiner

| | 0 | 1 | 2 | 3 | 4 | 5 | 6 |
|---|---|---|---|---|---|---|---|
| MT | Unavailable | Available | Available | Available | Available | Available | Unavailable |
| DU | Hard (hard) symbol | Soft (soft) symbol | Soft (soft) symbol | Soft (soft) symbol | Soft (soft) symbol | Soft (soft) symbol | Hard (hard) symbol |

FIG. 9

| MT resource | 0 | 1 | 2 | 3 | 4 | 5 |
|---|---|---|---|---|---|---|
| DU resource (configured value) | 0 Hard (Hard) | 1 Hard (Hard) | 2 Hard (Hard) | 3 Soft (Soft) | 4 Soft (Soft) | 5 Soft (Soft) |
| DU resource (after softening) N=1 | 0 Hard (Hard) | 1 Hard (Hard) | 2 Soft (Soft) or N/A | 3 Soft (Soft) | 4 Soft (Soft) | 5 Soft (Soft) |
| DU resource (after softening) N=2 | 0 Hard (Hard) | 1 Soft (Soft) or N/A | 2 Soft (Soft) or N/A | 3 Soft (Soft) | 4 Soft (Soft) | 5 Soft (Soft) |

FIG. 35

| MT resource | 0 | 1 | 2 | 3 | 4 | 5 |
|---|---|---|---|---|---|---|
| DU resource (configured value) | 0 Soft (Soft) | 1 Soft (Soft) | 2 Soft (Soft) | 3 Hard (Hard) | 4 Hard (Hard) | 5 Hard (Hard) |
| DU resource (after softening) N=1 | 0 Soft (Soft) | 1 Soft (Soft) | 2 Soft (Soft) | 3 Soft (Soft) or N/A | 4 Hard (Hard) | 5 Hard (Hard) |
| DU resource (after softening) N=2 | 0 Soft (Soft) | 1 Soft (Soft) | 2 Soft (Soft) | 3 Soft (Soft) or N/A | 4 Soft (Soft) or N/A | 5 Hard (Hard) |

FIG. 36

RESOURCE MULTIPLEXING METHOD AND APPARATUS

CROSS-REFERENCE TO RELATED APPLICATIONS

This application is a continuation of International Application No. PCT/CN2020/109629, filed on Aug. 17, 2020, which claims priority to Chinese Patent Application No. 201910760301.7, filed on Aug. 16, 2019. The disclosures of the aforementioned applications are hereby incorporated by reference in their entireties.

TECHNICAL FIELD

This application relates to the field of communications technologies, and in particular, to a resource multiplexing method and apparatus.

BACKGROUND

With continuous development of mobile communications technologies, spectrum resources become increasingly insufficient. To improve spectrum utilization, base stations are to be deployed more densely in the future. In addition, because of dense deployment, coverage holes can be avoided. In a conventional cellular network architecture, a base station establishes a connection to a core network by using an optical fiber. However, deployment of optical fibers is costly in many scenarios. A relay node (RN) establishes a connection to the core network through a wireless backhaul link, to reduce a part of costs of deployment of optical fibers.

In a long term evolution (LTE) system, a donor node allocates a backhaul link resource to an RN in a unit of a subframe (1 ms). One subframe includes 14 OFDM symbols. A subframe allocated to a backhaul link may be referred to as a downlink backhaul subframe. In the LTE system, one piece of dedicated resource configuration signaling is configured to indicate numbers of start symbols and end symbols in two slots (the first seven symbols and the last seven symbols) in a downlink backhaul subframe. Then the RN may communicate with the donor node based on the resource configuration information.

Currently, an in-band relay solution is proposed. In-band relay is a relay solution in which a backhaul link and an access link share a same frequency band. The in-band relay is usually subject to a half-duplex constraint. Specifically, when receiving a downlink signal sent by a parent node of a relay node, the relay node cannot send a downlink signal to a child node of the relay node, and when receiving an uplink signal sent by the child node of the relay node, the relay node cannot send an uplink signal to the parent node of the relay node. An in-band relay solution in a new-generation wireless communications system (new radio, NR) is referred to as integrated access and backhaul (JAB). When an IAB node operates normally, resource multiplexing is performed on an access link and a backhaul link in a time division manner, a space division manner, or a frequency division manner.

Resource allocation in an NR JAB system differs from that in an LTE relay system in the following aspects.

(1) NR JAB is deployed in a high frequency band. In the high frequency band, an IAB node has a shorter power amplifier on/off time and shorter symbol duration. This may cause a change in a set of available symbols of a backhaul link and an access link.

(2) In NR, a backhaul and access resource configuration at a symbol granularity (or a symbol level) may be used. Therefore, a method for configuring start and end symbols based on a slot level in the LTE relay system is not suitable for the NR JAB system.

In conclusion, a method for determining a set of available symbols in the LTE relay system is not suitable for the NR JAB system.

SUMMARY

Embodiments of this application provide a resource multiplexing method and apparatus, to resolve a problem of how to determine a set of available symbols in an NR JAB system.

According to a first aspect, an embodiment of this application provides a resource multiplexing method. The method includes: A first node determines a time domain position of a first resource of a communications device, and determines time domain positions of second resources of the communications device based on the time domain position and a type of the first resource and guard interval information. The guard interval information includes a first symbol quantity and a second symbol quantity, the first symbol quantity is a quantity of guard symbols during switching from the first resource to the second resource, and the second symbol quantity is a quantity of guard symbols during switching from the second resource to the first resource; and the first resource is a mobile terminal MT resource, and the second resource is a distributed unit DU resource; or the first resource is a DU resource, and the second resource is an MT resource.

In this embodiment of this application, the first node may derive a time domain position of an MT resource based on a time domain position and a type of a DU resource and guard interval information, or may derive a time domain position of a DU resource based on a time domain position and a type of an MT resource and guard interval information. It can be learned that, this embodiment of this application is applicable to a backhaul and access resource configuration at a symbol granularity (or a symbol level), so that a set of available symbols can be determined in an NR JAB system.

In a possible design, a type of the DU resource may include hard and soft; and a type of the MT resource includes available and unavailable. According to the foregoing design, the first node can implement mutual derivation between a DU hard symbol and an MT available symbol.

In a possible design, when determining the time domain positions of the second resources of the communications device based on the time domain position of the first resource and the guard interval information, the first node may determine, based on a position of an end symbol of the first resource and the first symbol quantity, a position of a start symbol of a second resource located after the first resource; and the first node may determine, based on a position of a start symbol of the first resource and the second symbol quantity, a position of an end symbol of a second resource located before the first resource. According to the foregoing design, a boundary symbol of the MT resource can be determined based on the guard interval information and a boundary symbol of the DU resource, or a boundary symbol of the DU resource can be determined based on the guard interval information and a boundary symbol of the MT resource.

In a possible design, when determining, based on the position of the end symbol of the first resource and the first symbol quantity, the position of the start symbol of the second resource located after the first resource, the first node may determine that the start symbol of the second resource located after the first resource is located after the end symbol of the first resource, and there are N symbols between the start symbol of the second resource and the end symbol of the first resource, where N is the first symbol quantity; and when determining, based on the position of the start symbol of the first resource and the second symbol quantity, the position of the end symbol of the second resource located before the first resource, the first node may determine that the end symbol of the second resource located before the first resource is located after the start symbol of the first resource, and there are M symbols between the end symbol of the second resource and the start symbol of the first resource, where M is the second symbol quantity. In the foregoing design, there are a plurality of unavailable symbols between adjacent boundary symbols of two resources, so that interference between MT transmission and DU transmission can be reduced.

In a possible design, when determining the time domain positions of the second resources of the communications device based on the time domain position of the first resource and the guard interval information, the first node may determine, based on a position of an end symbol of the first resource, a position of a start symbol of a second resource located after the first resource; and determine, based on a position of a start symbol of the first resource, a position of an end symbol of a second resource located before the first resource; and after determining the time domain positions of the second resources of the communications device based on the time domain position of the first resource and the guard interval information, the first node may further puncture or soften the first resource based on the first symbol quantity, or puncture or soften the first resource based on the second symbol quantity. In the foregoing design, according to a method for puncturing the first resource, there may be a plurality of unavailable symbols between adjacent boundary symbols of two resources, so that interference between MT transmission and DU transmission can be reduced.

In a possible design, when determining, based on the position of the end symbol of the first resource, the position of the start symbol of the second resource located after the first resource, and puncturing or softening the first resource based on the first symbol quantity, the first node may determine that an index of the position of the start symbol of the second resource located after the first resource and an index of the position of the end symbol of the first resource are consecutive, and puncture or soften the last N symbols of the first resource, where N is the first symbol quantity. In the foregoing design, the first resource and the second resource may be continuous in time domain. A tail of the first resource is softened or punctured, so that data transmission can be avoided at the tail of the first resource, thereby reducing interference between MT transmission and DU transmission.

In a possible design, when determining, based on the position of the start symbol of the first resource, the position of the end symbol of the second resource located before the first resource, and puncturing or softening the first resource based on the second symbol quantity, the first node may determine that an index of the position of the end symbol of the second resource located before the first resource and an index of the position of the start symbol of the first resource are consecutive, and puncture or soften the first M symbols of the first resource, where M is the second symbol quantity. In the foregoing design, the second resource and the first resource may be continuous in time domain. A head of the first resource is softened or punctured, so that data transmission can be avoided at the head of the first resource, thereby reducing interference between MT transmission and DU transmission.

In a possible design, the first resource may be the DU resource, and after determining the time domain positions of the second resources of the communications device based on the time domain position of the first resource and the guard interval information, the first node may determine that at least one DU symbol of the soft type is indicated as available; and the first node redetermines a time domain position of the second resource based on a position of the DU symbol indicated as available, the time domain position of the first resource, the first symbol quantity, and the second symbol quantity. In the foregoing design, when a DU soft symbol is indicated as available, an available symbol of the MT resource is redetermined, so that interference caused by the soft symbol indicated as available to MT transmission and interference caused by MT transmission to the soft symbol can be avoided.

In a possible design, the first node is the communications device, or the first node is a parent node or a donor node of the communications device. According to the foregoing design, both the communications device and the parent node or the donor node of the communications device can determine a set of available symbols by using the method in this application.

In a possible design, if the first node is a parent node or a donor node of the communications device, the first node may receive the guard interval information reported by the communications device. According to the foregoing design, the parent node or the donor node of the communications device can obtain accurate guard interval information, so that accuracy of a determined set of available symbols can be improved.

In a possible design, if the first node is the communications device, the first node may determine the guard interval information. According to the foregoing design, the first node can obtain the guard interval information, so that a set of available symbols can be determined.

In a possible design, if the first node is the communications device, after determining the guard interval information, the first node may further report the guard interval information to a second node, where the second node is a parent node or a donor node of the communications device. According to the foregoing design, the parent node or the donor node of the communications device can also obtain the guard interval information, so that a set of available symbols can be determined by using the method in this application.

In a possible design, when determining the guard interval information, the first node may determine the guard interval information based on a time difference between the first resource and the second resource. The time difference exists between the two resources, and the time difference causes interference to MT transmission and DU transmission. Therefore, according to the foregoing design, interference between MT transmission and DU transmission can be reduced.

In a possible design, when determining the guard interval information, the first node may determine the guard interval information based on a time difference between the first resource and the second resource and a switching time, where the switching time is a time required by the communications device to perform switching between receiving and sending. When transmission directions of the two resources are the same, actions performed by the communications device are different. Therefore, when switching between the two resources is performed, the communications device needs to switch from receiving to sending, or from sending to receiving. In the foregoing design, the guard interval information is determined based on the time difference between the first resource and the second resource and the switching time, so that interference between MT transmission and DU transmission can be reduced.

In a possible design, when determining the guard interval information based on the time difference between the first resource and the second resource, the first node may determine the first symbol quantity and the second symbol quantity based on the time difference between the first resource and the second resource and a parameter set, where the parameter set is at least one of the following information: subcarrier spacings of the first resource and the second resource, and cyclic prefix CP types of the first resource and the second resource. When determining the guard interval information based on the time difference between the first resource and the second resource and the switching time, the first node may alternatively determine the first symbol quantity and the second symbol quantity based on the time difference between the first resource and the second resource, the switching time, and a parameter set, where the parameter set is at least one of the following information: subcarrier spacings of the first resource and the second resource, and CP types of the first resource and the second resource. When different values are assigned to the parameter set, symbol lengths are different. According to the foregoing design, a relatively accurate quantity of guard symbols can be obtained.

In a possible design, the type of the first resource may be uplink, downlink, or flexible, and a type of the second resource may also be uplink, downlink, or flexible.

According to a second aspect, this application provides a resource multiplexing apparatus. The apparatus may be a first node, or may be a chip or a chip set in a first node. The first node may be a communications device, or may be a parent node or a donor node of a communications device. The apparatus may include a processing unit and a transceiver unit. When the apparatus is the first node, the processing unit may be a processor, and the transceiver unit may be a transceiver. The apparatus may further include a storage module. The storage module may be a memory, and the storage module is configured to store an instruction. The processing unit executes the instruction stored in the storage module, so that the first node performs a corresponding function in the first aspect. When the apparatus is the chip or the chip set in the first node, the processing unit may be a processor, and the transceiver unit may be an input/output interface, a pin, a circuit, or the like. The processing unit executes an instruction stored in a storage module, so that the first node performs a corresponding function in the first aspect. The storage module may be a storage module (for example, a register or a cache) in the chip or the chip set, or may be a storage module (for example, a read-only memory or a random access memory) located outside the chip or the chip set.

According to a third aspect, a resource multiplexing apparatus is provided, including a processor, a communications interface, and a memory. The communications interface is configured to transmit information, and/or a message, and/or data between the apparatus and another apparatus. The memory is configured to store a computer-executable instruction. When the apparatus runs, the processor executes the computer-executable instruction stored in the memory, so that the apparatus performs the resource multiplexing method according to any one of the first aspect or the designs of the first aspect.

According to a fourth aspect, this application further provides a computer-readable storage medium. The computer-readable storage medium stores an instruction; and when the instruction is run on a computer, the computer is enabled to perform the resource multiplexing method according to any one of the first aspect or the designs of the first aspect.

According to a fifth aspect, this application further provides a computer program product including an instruction. When the computer program product runs on a computer, the computer is enabled to perform the resource multiplexing method according to any one of the first aspect or the designs of the first aspect.

According to a sixth aspect, an embodiment of this application provides a chip. The chip is coupled to a memory, and performs the resource multiplexing method according to any one of the first aspect or the designs of the first aspect in the embodiments of this application.

It should be noted that "coupling" in the embodiments of this application refers to a direct combination or an indirect combination between two components.

BRIEF DESCRIPTION OF THE DRAWINGS

FIG. 9 is a schematic diagram of a relationship between an MT resource and a DU resource according to an embodiment of this application;

FIG. 35 is a schematic diagram of resource multiplexing according to an embodiment of this application;

FIG. 36 is a schematic diagram of resource multiplexing according to an embodiment of this application;

DETAILED DESCRIPTION OF ILLUSTRATIVE EMBODIMENTS

With continuous development of mobile communications technologies, spectrum resources become increasingly insufficient. To improve spectrum utilization, base stations are to be deployed more densely in the future. In addition, because of dense deployment, coverage holes can be avoided. In a conventional cellular network architecture, a base station establishes a connection to a core network by using an optical fiber. However, deployment of optical fibers is costly in many scenarios. A wireless relay node (RN) establishes a connection to the core network through a wireless backhaul link, to reduce a part of costs of deployment of optical fibers.

Usually, the relay node establishes the wireless backhaul link with one or more parent nodes, and accesses the core network through the parent node. The parent node may perform control (for example, data scheduling, timing modulation, and power control) on the relay node to a specific degree by using a plurality of types of signaling. In addition, the relay node may serve a plurality of child nodes. The parent node of the relay node may be a base station, or may be another relay node. The child node of the relay node may be user equipment (UE), or may be another relay node. In some cases, the parent node may also be referred to as an upstream node, and the child node may also be referred to as a downstream node.

In-band relay is a relay solution in which a backhaul link and an access link share a same frequency band. Because no additional spectrum resource is used, the in-band relay has advantages such as high spectral efficiency and low deployment costs. The in-band relay is usually subject to a half-duplex constraint. Specifically, when receiving a downlink signal sent by a parent node of a relay node, the relay node cannot send a downlink signal to a child node of the relay node, and when receiving an uplink signal sent by the child node of the relay node, the relay node cannot send an uplink signal to the parent node of the relay node. An in-band relay solution in a new-generation wireless communications system (new radio, NR) is referred to as integrated access and backhaul (JAB), and a relay node is referred to as an IAB node.

Figure 1:
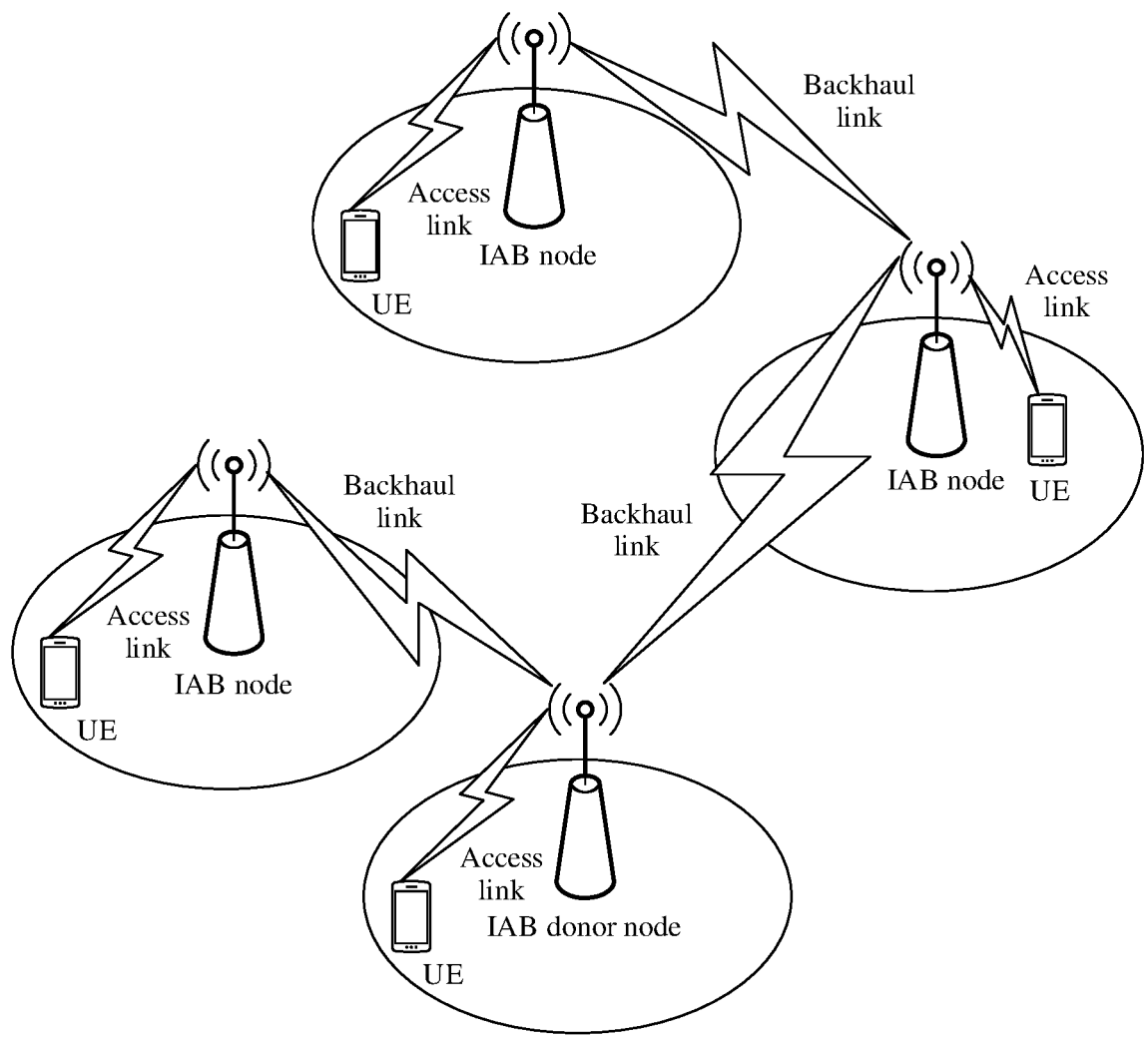
FIG. 1 is a schematic structural diagram of an JAB system according to an embodiment of this application.

As shown in FIG. 1, an IAB node provides wireless access and wireless backhaul of an access service for UE. An JAB donor node provides a wireless backhaul function for the JAB node and provides an interface between the UE and a core network. The IAB node is connected to the JAB donor node through a wireless backhaul link, so that the UE served by the IAB node is connected to the core network.

When the IAB node operates normally, resource multiplexing is performed on an access link and a backhaul link in a time division manner, a space division manner, or a frequency division manner. A time division multiplexing (TDM) scenario is used as an example. The backhaul link and the access link operate at different moments. Therefore, the IAB node needs to perform switching between receiving and sending on the backhaul link and switching between receiving and sending on the access link. When switching is performed on the backhaul link and the access link with no interval, that is, when symbols of the access link and the backhaul link are consecutive, the IAB node has highest resource utilization. However, during implementation, due to various factors such as a power amplifier on/off time, a transmission distance, and non-ideal synchronization, switching with no interval cannot be implemented on the backhaul link and the access link. In this case, the IAB node needs to determine a set of available/unavailable symbols of the backhaul link and the access link.

In NR, an IAB node may be divided into two parts: a mobile terminal (MT) and a distributed unit (DU). The MT is used by the IAB node to communicate with a parent node, and the DU is used by the IAB node to communicate with a child node. The parent node may be a common base station (such as a gNB), or may be another IAB node. The child node may be UE, or may be another IAB node.

Figure 2:
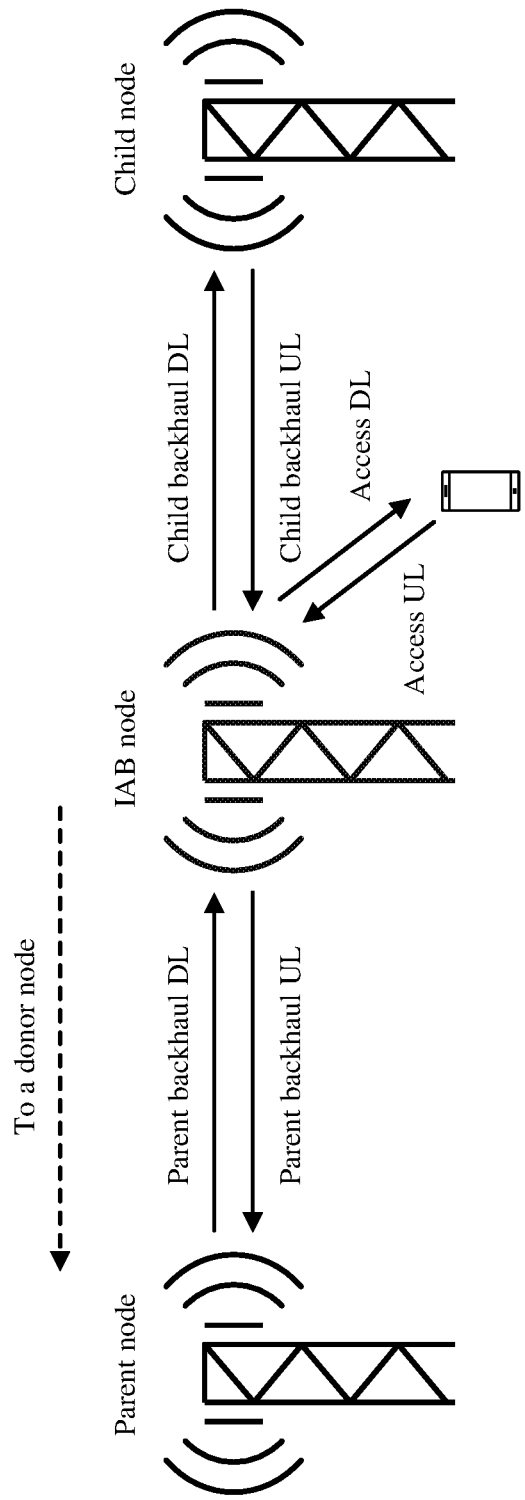
FIG. 2 is a schematic diagram of a backhaul link and an access link according to an embodiment of this application.

A link for communication between the MT and the parent node is referred to as a parent backhaul link (parent BH link), a link for communication between the DU and a child IAB node is referred to as a child backhaul link (child BH link), and a link for communication between the DU and connected UE is referred to as an access link. The parent backhaul link includes a parent backhaul uplink (UL) and a parent backhaul downlink (DL); the child backhaul link includes a child backhaul UL and a child backhaul DL; and the access link includes an access UL and an access DL, as shown in FIG. 2. In some cases, the child backhaul link is also referred to as an access link.

First, existing conclusions of NR JAB resource allocation are described:

MT resource: MT resources of an IAB node may be configured, based on transmission directions, as three types: downlink (D), uplink (U), and flexible (F). The three transmission direction based types are also supported by existing UE, and therefore may be indicated by using existing signaling.

DU resource: DU resources of the IAB node may be classified, based on transmission directions, into four types: uplink, downlink, flexible, and unavailable (Null, N). Further, DU uplink, downlink, and flexible resources may be further classified, based on resource scheduling, into two types: hard (H) and soft (S).

The details are described as follows:

DU hard resource: A DU hard resource indicates a resource always available to the DU.

DU soft resource: Whether a DU soft resource is available to the DU depends on an indication of a parent node.

In conclusion, there are three resource types for MT resources of the IAB node (that is, the three transmission direction based types: D/U/F), and there are seven resource types for DU resources of the IAB node (that is, seven types in total: six types in total for combinations of any two of the three transmission direction based types (D/U/F) and two resource multiplexing based types (H/F), and the transmission direction based type N). After any two of the three resource types of the MT resources and the seven resource types of the DU resources are combined, when a multiplexing manner of the MT resource and the DU resource is TDM, behavior of all possible resource combinations of the DU and the MT may be shown in Table 1, where "MT: Tx" indicates that the MT should perform transmission after being scheduled; "DU: Tx" indicates that the DU may perform transmission; "MT: Rx" indicates that the MT is capable of performing receiving (if there is a signal that needs to be received); "DU: Rx" indicates that the DU may schedule uplink transmission of a child node; "MT: Tx/Rx" indicates that the MT should perform transmission or receiving after being scheduled, but transmission and receiving are not performed at the same time; "DU: Tx/Rx" indicates that the DU may perform transmission or receive transmission of a child node, but transmission and receiving are not performed at the same time; "IA" indicates that the DU resource is explicitly or implicitly indicated as available; "INA" indicates that the DU resource is explicitly or implicitly indicated as unavailable; "MT: NULL" indicates that the MT does not perform sending and does not need to have a receive capability; and "DU: NULL" indicates that the DU does not perform sending and does not receive transmission of a child node.

TABLE 1

| DU configuration | MT configuration | | |
|---|---|---|---|
| | DL | UL | F |
| DL-H | 1. DU: Tx | 3. DU: Tx | 5. DU: Tx |
| | 2. MT: NULL | 4. MT: NULL | 6. MT: NULL |
| DL-S | 7. When DU resource: IA | 14. When DU resource: IA | 21. When DU resource: IA |
| | 8. DU: Tx | 15. DU: Tx | 22. DU: Tx |
| | 9. MT: NULL | 16. MT: NULL | 23. MT: NULL |
| | 10. | 17. | 24. |
| | 11. When DU resource: INA | 18. When DU resource: INA | 25. When DU resource: INA |
| | 12. DU: NULL | 19. DU: NULL | 26. DU: NULL |
| | 13. MT: Rx | 20. MT: Tx | 27. MT: Tx/Rx |
| UL-H | 28. DU: Rx | 30. DU: Rx | 32. DU: Rx |
| | 29. MT: NULL | 31. MT: NULL | 33. MT: NULL |
| UL-S | 34. When DU resource: IA | 41. When DU resource: IA | 48. When DU resource: IA |
| | 35. DU: Rx | 42. DU: Rx | 49. DU: Rx |
| | 36. MT: NULL | 43. MT: NULL | 50. MT: NULL |
| | 37. | 44. | 51. |
| | 38. When DU resource: INA | 45. When DU resource: INA | 52. When DU resource: INA |
| | 39. DU: NULL | 46. DU: NULL | 53. DU: NULL |
| | 40. MT: Rx | 47. MT: Tx | 54. MT: Tx/Rx |
| F-H | 55. DU: Tx/Rx | 57. DU: Tx/Rx | 59. DU: Tx/Rx |
| | 56. MT: NULL | 58. MT: NULL | 60. MT: NULL |
| F-S | 61. When DU resource: IA | 68. When DU resource: IA | 75. When DU resource: IA |

TABLE 1-continued

| DU configuration | MT configuration | | |
|---|---|---|---|
| | DL | UL | F |
| | 62. DU: Tx/Rx | 69. DU: Tx/Rx | 76. DU: Tx/Rx |
| | 63. MT: NULL | 70. MT: NULL | 77. MT: NULL |
| | 64. | 71. | 78. |
| | 65. When DU resource: INA | 72. When DU resource: INA | 79. When DU resource: INA |
| | 66. DU: NULL | 73. DU: NULL | 80. DU: NULL |
| | 67. MT: Rx | 74. MT: Tx | 81. MT: Tx/Rx |
| NA | 82. DU: NULL | 84. DU: NULL | 86. DU: NULL |
| | 83. MT: Rx | 85. MT: Tx | 87. MT: Tx/Rx |

Figure 3:
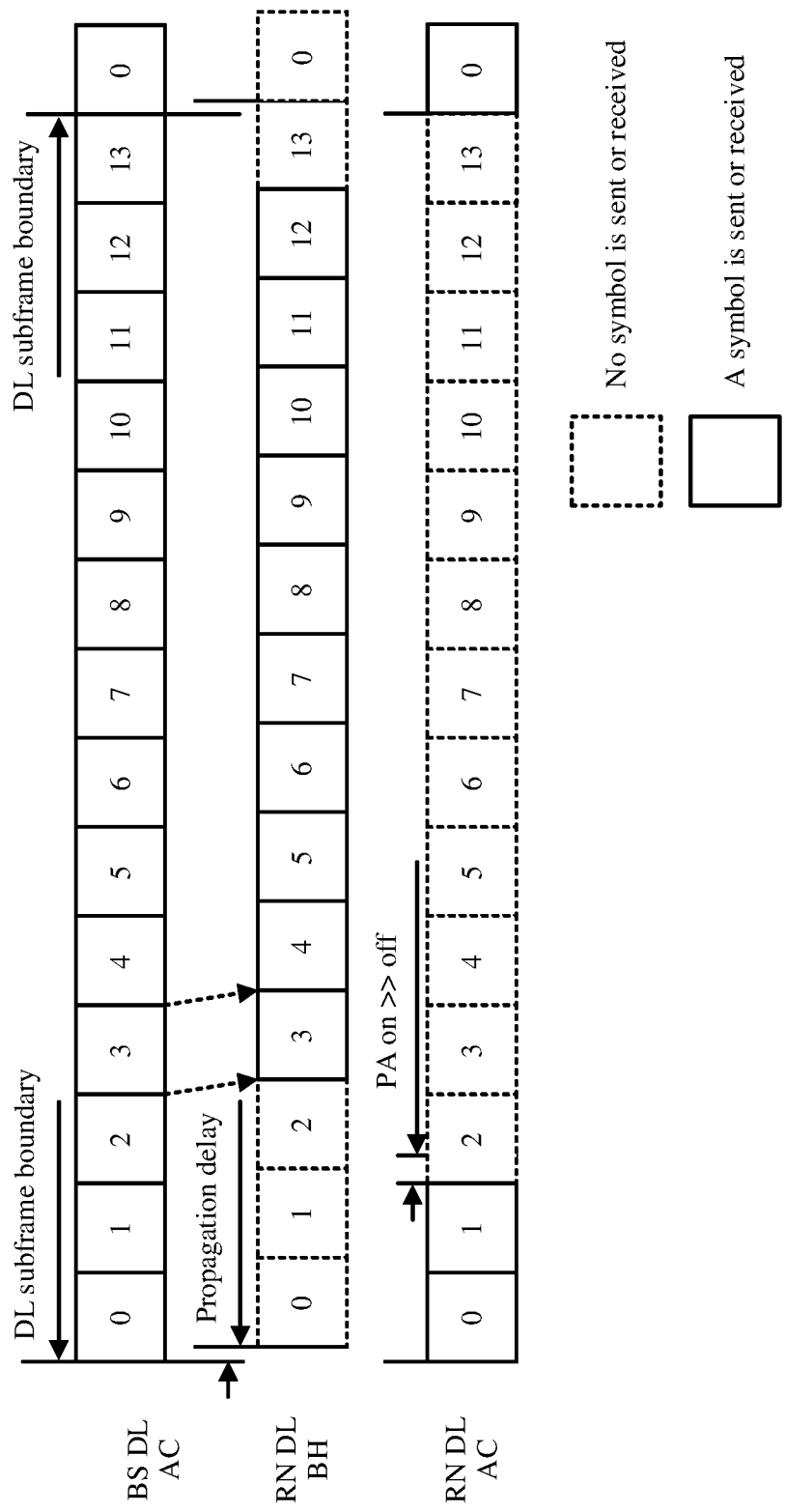
FIG. 3 is a schematic diagram of resource allocation according to an embodiment of this application.

In a long term evolution (LTE) relay system, time division multiplexing is performed on a backhaul link and an access link, and a problem of determining a set of unavailable symbols of the backhaul link and the access link is also involved. In LTE, a donor node allocates a backhaul link resource to an RN in a unit of a subframe (1 ms). One LTE subframe includes 14 orthogonal frequency division multiplexing (OFDM) symbols. FIG. 3 is a schematic diagram of LTE downlink backhaul resource allocation. It can be learned that, although the second subframe shown in FIG. 3 is a backhaul subframe, the relay node still needs to send a physical downlink control channel (PDCCH) on the first two symbols (symbols 0 and 1) on the access link. After the first two symbols are transmitted, the RN switches to a receiving state, to receive a PDSCH on the backhaul link. During the switching, the RN needs a specific time to turn off a power amplifier, that is, a specific time is required for switching between sending and receiving. Therefore, in addition to the symbols 0 and 1, the RN cannot perform receiving on a symbol 2 on the backhaul link. In other words, the RN starts to perform receiving from a symbol 3 on the backhaul link. The RN needs to switch back to sending of the PDCCH on the access link in a next subframe. Due to existence of a propagation delay, a symbol 0 of the next subframe partially overlaps a symbol 13 of a current subframe (in addition, a time is also required for switching between receiving and sending of the RN). Therefore, the RN cannot perform receiving on the symbol 13 on the backhaul link either. In conclusion, in the backhaul subframe, the donor node performs backhaul link transmission only on the symbol 3 to a symbol 12 for the RN. It should be noted that it is assumed herein that a quantity of PDCCH symbols is 2. In practice, if the quantity of PDCCH symbols is another value, a downlink start symbol is different. For example, when a quantity of PDCCH symbols sent by the RN is 1, the RN starts to perform receiving from the symbol 2 on the backhaul link.

It can be learned that in the LTE relay system, if a position of a symbol for sending on the access link is determined, for example, the first two symbols of the subframe in FIG. 3 are determined for sending on the access link, a set of available symbols of the backhaul link may also be obtained. Actually, in LTE, there is one piece of dedicated resource configuration signaling used to indicate numbers of start symbols and end symbols in two slots (the first seven symbols and the last seven symbols) in a downlink backhaul subframe (an LTE subframe includes a total of 14 normal cyclic prefix (CP) symbols). Then the relay node communicates with the donor node based on the resource configuration information.

However, resource allocation in an NR JAB system differs from that in the LTE relay system in the following aspects:

(1) NR JAB is deployed in a high frequency band. In the high frequency band, an IAB node has a shorter power amplifier on/off time and shorter symbol duration. This may cause a change in a set of available symbols of a backhaul link and an access link.

(2) In NR, a backhaul and access resource configuration at a symbol granularity (or a symbol level) may be used. Therefore, a method for configuring start and end symbols based on a slot level in the LTE relay system is not suitable for the NR JAB system.

In conclusion, a method for determining a set of available symbols in the LTE relay system is not suitable for the NR JAB system. Based on this, the embodiments of this application provide a resource multiplexing method and apparatus. The method and the apparatus are based on a same technical concept. Because a problem-resolving principle of the method is similar to that of the apparatus, mutual reference may be made to implementations of the apparatus and the method. Repeated parts are not described in detail again.

Figure 4:
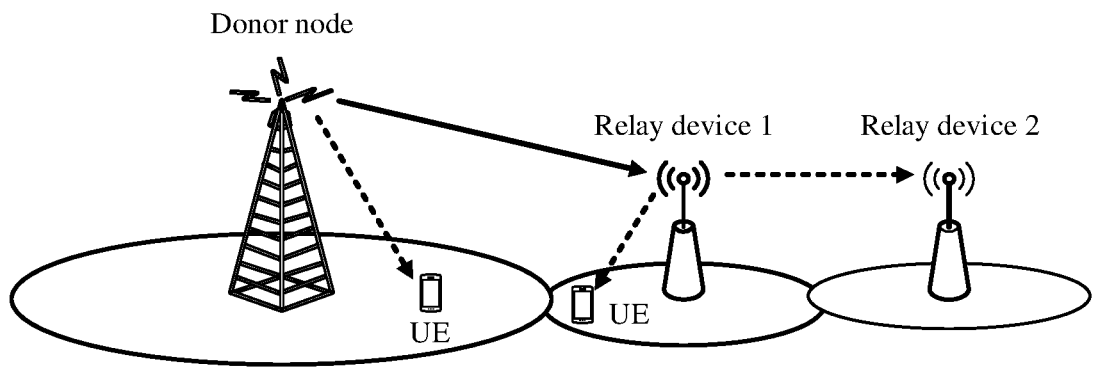
FIG. 4 is a schematic architectural diagram of a wireless communications system according to an embodiment of this application.

The resource multiplexing method provided in the embodiments of this application may be applied to a wireless communications system having a relay node, as shown in FIG. 4. It should be understood that FIG. 4 is merely an example for description, and quantities of terminal devices and relay devices included in the wireless communications system are not specifically limited. In NR, the relay device is generally referred to as an IAB node. In LTE, the relay device is generally referred to as an RN.

The communications system shown in FIG. 4 may include various communications systems, for example, may be the Internet of Things (IoT), the narrowband Internet of Things (NB-IoT), or long term evolution (LTE), or may be a fifth generation (5G) communications system, or may be a hybrid architecture of LTE and 5G, or may be a 5G new radio (NR) system, a global system for mobile communications (GSM) system, a universal mobile communications system (UMTS), a code division multiple access (CDMA) system, and a new communications system that will emerge in future communication development.

It should be understood that a network device in the embodiments of this application is configured to connect a terminal to a wireless network. The network device may be referred to as a base station, or may be referred to as a radio access network (RAN) node (or device). For example, the network device may be a next-generation Node B (gNB), a transmission reception point (transmission reception point, TRP), an evolved NodeB (eNB), a radio network controller (RNC), a NodeB (NB), a base station controller (BSC), a base transceiver station (BTS), a home base station (for example, a home evolved NodeB or a home Node B, HNB), a baseband unit (BBU), or a wireless fidelity (Wi-Fi) access point (AP). In the embodiments of this application, a name of the network device may be a relay node (RN), a relay transmission reception point (rTRP), an IAB node, or the like; and a parent node of the relay node may be a gNB (including a gNB-DU, a gNB-CU, and the like), or may be another relay node.

Figure 5:
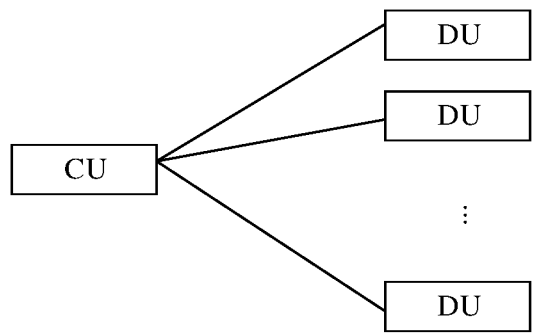
FIG. 5 is a schematic structural diagram of a network device according to an embodiment of this application.

For example, a structure of the network device in the embodiments of this application may be shown in FIG. 5. Specifically, the radio access network device may be divided into a central unit (CU) and at least one distributed unit (DU). The CU may be configured to manage or control the at least one DU, which may also be referred to as a connection between the CU and the at least one DU. In this structure, protocol layers of the radio access network device in the communications system may be split. Some protocol layers are controlled by the CU in a centralized manner, functions of some or all of remaining protocol layers are distributed in the DU, and the CU controls the DU in a centralized manner. For example, the radio access network device is a gNB. Protocol layers of the gNB include a radio resource control (RRC) layer, a service data adaptation protocol (SDAP) layer, a packet data convergence protocol (PDCP) layer, a radio link control (RLC) layer, a media access control (MAC) layer, and a physical layer. For example, the CU may be configured to implement functions of the RRC layer, the SDAP layer, and the PDCP layer, and the DU may be configured to implement functions of the RLC layer, the MAC layer, and the physical layer. Protocol stacks included in the CU and the DU are not specifically limited in the embodiments of this application.

Figure 6:
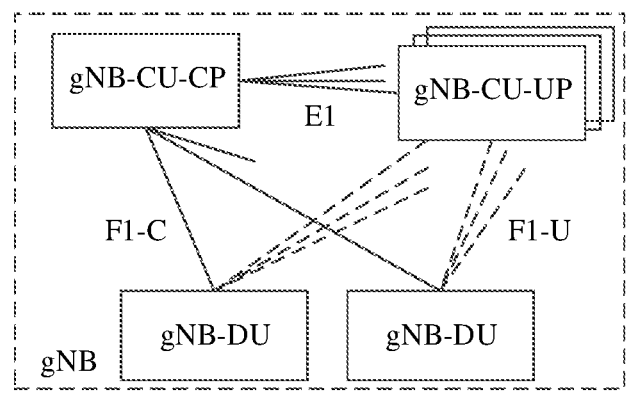
FIG. 6 is a schematic structural diagram of another network device according to an embodiment of this application.

For example, the CU in the embodiments of this application may be further divided into one control plane (CU-control plane, CU-CP) network element and a plurality of user plane (CU-user plane, CU-UP) network elements. The CU-CP may be used for control plane management, and the CU-UP may be used for user plane data transmission. An interface between the CU-CP and the CU-UP may be an E1 interface. An interface between the CU-CP and the DU may be F1-C, and is used for control plane signaling transmission. An interface between the CU-UP and the DU may be F1-U, and is used for user plane data transmission. The CU-UP and the CU-UP may be connected through an Xn-U interface, to perform user plane data transmission. For example, the gNB is used as an example, and a structure of the gNB may be shown in FIG. 6.

Figure 7:
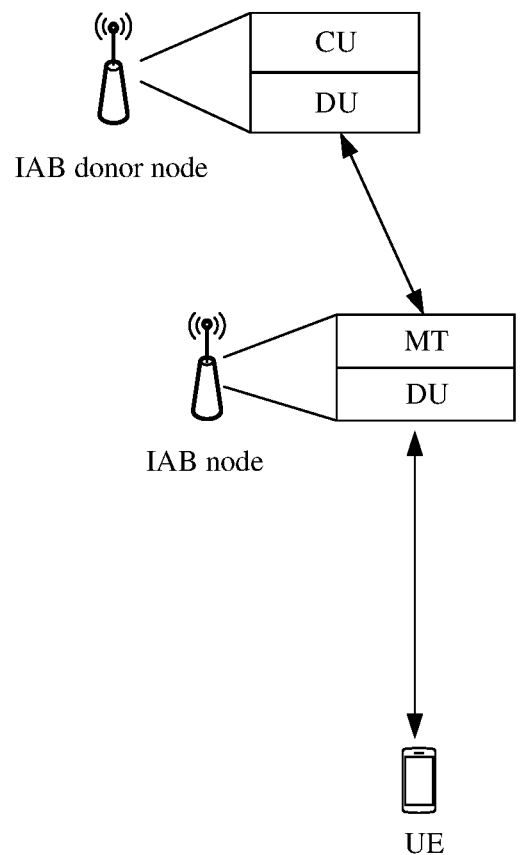
FIG. 7 is a schematic diagram of communication of an IAB node according to an embodiment of this application.
Figure 8:
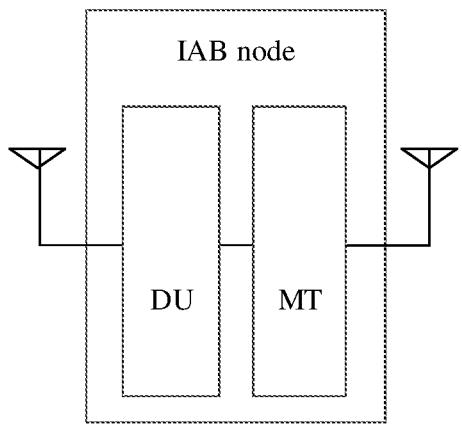
FIG. 8 is a schematic structural diagram of an IAB node according to an embodiment of this application.

If the network device is a relay device, especially an IAB node, the network device may include a function of a mobile terminal (MT) and a function of a DU. To be specific, the IAB node communicates with a parent node through the MT, and the DU is a base station function module of the IAB node, is configured to implement functions of an RLC layer, a MAC layer, and a physical layer, and is mainly responsible for scheduling and physical signal generation and sending. That is, the IAB node communicates with a child node and UE through the DU, as shown in FIG. 7. The MT and the DU of the IAB node both have complete transceiver modules, and there is an interface between the MT and the DU. However, it should be noted that the MT and the DU are logical modules. In practice, the MT and the DU may share some sub-modules, for example, may share a transceiver antenna and a baseband processing module, as shown in FIG. 8.

The terminal device in the embodiments of this application is an entity configured to receive or transmit a signal on a user side. The terminal device is a device that provides a user with voice and/or data connectivity, for example, a handheld device or a vehicle-mounted device having a wireless connection function. The terminal may alternatively be another processing device connected to a wireless modem. The terminal may communicate with one or more core networks via a radio access network (RAN). The terminal may also be referred to as a wireless terminal, a subscriber unit, a subscriber station, a mobile station, a remote station, an access point, a remote terminal, an access terminal, a user terminal, a user agent, a user device, user equipment, or the like. The terminal device may be a mobile terminal, for example, a mobile phone (or referred to as a "cellular" phone), and a computer that has a mobile terminal. For example, the terminal device may be a portable, pocket-size, handheld, computer built-in, or vehicle-mounted mobile apparatus, which exchanges a voice and/or data with the radio access network. For example, the terminal device may alternatively be a device such as a personal communications service (PCS) phone, a cordless telephone set, a session initiation protocol (SIP) phone, a wireless local loop (WLL) station, or a personal digital assistant (PDA). For example, common terminal devices include a mobile phone, a tablet computer, a notebook computer, a palmtop computer, a mobile Internet device (MID), and a wearable device such as a smartwatch, a smart band, or a pedometer. However, the embodiments of this application are not limited thereto.

It should be understood that, in the embodiments of this application, "at least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/" generally represents an "or" relationship between the associated objects. "At least one of the following" or a similar expression thereof indicates any combination of the following, and includes any combination of one or more of the following. For example, at least one of a, b, or c may indicate a, b, c, a and b, a and c, b and c, or a, b, and c, where a, b, and c may be singular or plural.

The IAB node is a specific name of the relay node, and does not constitute a limitation on the solutions in this application. The IAB node may be one of the foregoing base stations or terminal devices that have a forwarding function, or may be in a form of an independent device. For example, the IAB node in this application may also be referred to as a relay node (relay node, RN), a transmission reception point (transmission and reception point), or a relay transmission reception point (relay TRP).

In addition, it should be understood that in the descriptions of this application, terms such as "first" and "second" are merely used for differentiation and description, but should not be understood as an indication or implication of relative importance, or should not be understood as an indication or implication of a sequence.

Before the resource multiplexing method provided in the embodiments of this application is described, a method for determining guard interval information is first described. It should be noted that the method for determining guard interval information and the resource multiplexing method provided in the embodiments of this application may be separately implemented as two solutions, or may be combined as a solution for implementation. This is not specifically limited herein. In this application, an example in which a communications device is an IAB node is used for description. In the embodiments of this application, guard interval information includes a first symbol quantity N and a second symbol quantity M, the first symbol quantity N is a quantity of guard symbols during switching from a first resource to a second resource, and the second symbol quantity M is a quantity of guard symbols during switching from the second resource to the first resource. The guard symbol is a symbol unavailable to second resources in a specific direction (D/U/F) before and after a first resource in the specific direction (D/U/F) when transmission is performed on the first resource.

The first resource may be an MT resource, and the second resource may be a DU resource; or the first resource may be a DU resource, and the second resource is an MT resource. It should be understood that the "MT resource" is only an example name of a transmission resource for communication between the IAB node and a parent node of the IAB node. In actual application, the transmission resource for communication between the IAB node and the parent node of the IAB node may also have another name, for example, an X resource. If the X resource can be used for communication between the IAB node and the parent node of the IAB node, the X resource may be considered as an MT resource in the embodiments of this application. Similarly, the "DU resource" is only an example name of a transmission resource for communication between the IAB node and a child node of the IAB node. In actual application, the transmission resource for communication between the IAB node and the child node of the IAB node may also have another name, for example, an A resource. If the A resource can be used for communication between the IAB node and the child node of the IAB node, the A resource may be considered as a DU resource in the embodiments of this application.

A type of the first resource may be uplink, downlink, or flexible based on a transmission direction, and a type of the second resource may be uplink, downlink, or flexible based on a transmission direction.

That the type of the first resource is uplink based on the transmission direction means that the first resource is always used for uplink transmission; that the type of the first resource is downlink based on the transmission direction means that the first resource is always used for downlink transmission; and that the type of the first resource is flexible based on the transmission direction means that the first resource may be indicated, in a signaling configuration, to be used for uplink transmission or downlink transmission. Similarly, that the type of the second resource is uplink based on the transmission direction means that the second resource is always used for uplink transmission; that the type of the second resource is downlink based on the transmission direction means that the second resource is always used for downlink transmission; and that the type of the second resource is flexible based on the transmission direction means that the second resource may be indicated, in a signaling configuration, to be used for uplink transmission or downlink transmission.

For ease of understanding, the following briefly describes resource configurations of an MT and a DU of the IAB node.

A semi-static configuration (D/U/F) of the MT resource of the IAB node based on the transmission direction is configured by a donor node or the parent node of the IAB node by using semi-static signaling. For example, the semi-static signaling may be radio resource control (RRC) signaling.

A semi-static resource (D/U/F/Null) of the DU resource of the IAB node based on the transmission direction is configured by the donor node or the parent node of the IAB node by using semi-static signaling or an interface message. For example, the interface message may be a message transferred through an F1-AP interface.

The DU resource is obtained explicitly or implicitly based on a resource multiplexing type (hard or soft).

Explicit configuration: The donor node or the parent node of the IAB node directly configures the DU resource (D/U/F) as hard or soft. In this case, the MT resource of the IAB node may be directly implicitly derived by a hard/soft configuration of the DU resource of the IAB node, or may be configured by the donor node or the parent node of the IAB node by using signaling.

Implicit configuration: The donor node or the parent node of the IAB node configures an available resource (or an unavailable resource) for the MT of the IAB node. A hard/soft resource configuration of the DU of the IAB node is implicitly derived from a resource configuration of the MT.

For both the explicit and implicit configurations, mutual derivation between types of the MT resource and the DU resource may exist. The following describes mutual derivation between the types of the MT resource and the DU resource by using an example. First, a case of TDM is considered:

Explicit DU configuration: For a DU hard resource, a corresponding MT resource is unavailable, that is, the MT does not communicate with the parent node on the DU hard resource.

Implicit DU configuration: For an MT unavailable resource, the DU may consider the resource as hard, that is, the DU may also communicate with the child node on the MT unavailable resource.

The DU hard resource is defined as follows: The hard resource is a resource always available to the DU. That is, the IAB node can always communicate with the child node on the DU hard resource, without considering a scheduling configuration status of the MT. Therefore, a relationship between a DU hard/soft resource and an MT available/unavailable resource is shown in FIG. 9. FIG. 9 shows seven symbols, where symbols 0 and 6 are DU hard symbols, and are always available to the DU. It is assumed that TDM multiplexing is performed. In this case, a corresponding MT symbol is an unavailable symbol. Symbols 1 to 5 in the figure are DU soft symbols. It can be learned from Table 1 that, a corresponding MT symbol is an available symbol.

In a possible implementation, the IAB node may report a DU hard/soft resource configuration of the IAB node to the parent node or the donor node of the IAB node.

The following describes in detail, with reference to the accompanying drawings, the method for determining guard interval information provided in the embodiments of this application.

Figure 10:
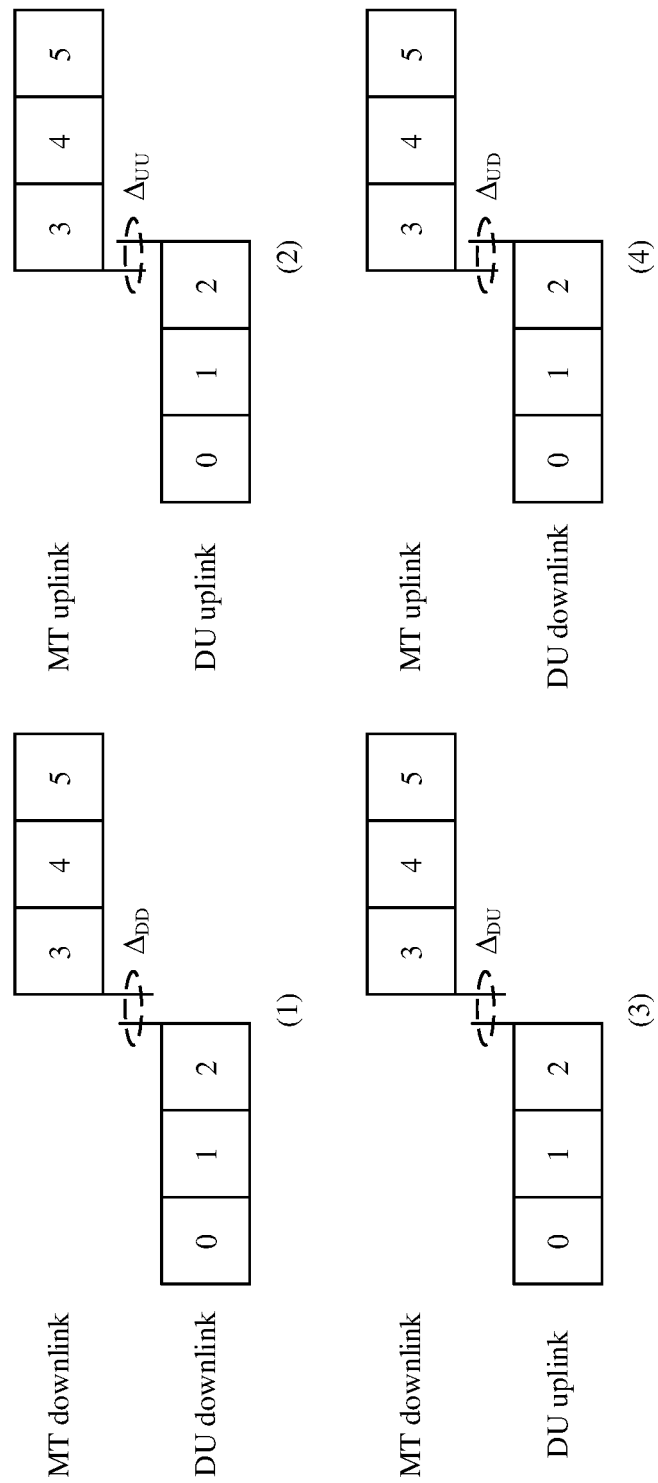
FIG. 10 is a schematic diagram of a time difference between an MT symbol and a DU symbol according to an embodiment of this application.

In actual deployment, due to a propagation delay and a non-ideal factor, the MT symbol and the DU symbol are not strictly aligned. Therefore, a plurality of time differences between the MT resource and the DU resource are first defined, as shown in FIG. 10.

Time difference (referred to as $\Delta_{DD}$ below) between an MT downlink symbol and a DU downlink symbol: Generally, downlink receiving of the MT is later than downlink sending of the DU. However, in some scenarios, downlink receiving of the MT may be earlier than downlink sending of the DU. Therefore, $\Delta_{DD}$ may be a signed value (that is, $\Delta_{DD}$ may be a positive number or a negative number), and a specific positive or negative sign of $\Delta_{DD}$ depends on a strict definition of the time difference. In the embodiments of this application, an example in which a time by which downlink receiving of the MT is later than downlink sending of the DU, namely, $\Delta_{DD}>0$ is used for description. Generally, $\Delta_{DD}=T_p+T_e$, where $T_p$ is a transmission delay between the IAB node and the parent node, and $T_e$ includes a non-ideal factor of synchronization, for example, a timing error between the DU of the IAB node and the parent node.

Time difference (referred to as $\Delta_{UU}$ below) between an MT uplink symbol and a DU uplink symbol: Generally, uplink sending of the MT is earlier than uplink receiving of the DU. However, in some scenarios, uplink sending of the MT is later than uplink receiving of the DU. Therefore, $\Delta_{UU}$ may also be a signed value (that is, $\Delta_{UU}$ may be a positive number or a negative number), and a specific positive or negative sign of $\Delta_{UU}$ depends on a strict definition of the time difference. In the embodiments of this application, an example in which $\Delta_{UU}$ is a time by which uplink sending of the MT is earlier than uplink receiving of the DU, and $\Delta_{UU}<0$ is used for description. Generally, $\Delta_{UU}=\Delta_{DD}+T_g-TA$, where $T_g$ is a time by which an uplink receive frame of the DU of the IAB node is earlier than a downlink transmit frame of the DU, and TA is a timing advance used by the MT of the IAB node for uplink transmission.

Time difference (referred to as $\Delta_{DU}$ below) between the MT downlink symbol and the DU uplink symbol: Generally, downlink receiving of the MT is later than uplink receiving of the DU. However, in some scenarios, downlink receiving of the MT is earlier than uplink receiving of the DU. Therefore, $\Delta_{DU}$ may also be a signed value (that is, $\Delta_{DU}$ may be a positive number or a negative number), and a specific positive or negative sign of $\Delta_{DU}$ depends on a strict definition of the time difference. In the embodiments of this application, an example in which $\Delta_{DU}$ is a time by which downlink receiving of the MT is later than uplink receiving of the DU, and $\Delta_{DU}>0$ is used for description. Generally, $\Delta_{DU}=\Delta_{DD}+T_g$.

Time difference (referred to as $\Delta_{UD}$ below) between the MT uplink symbol and the DU downlink symbol: Generally, uplink sending of the MT is earlier than downlink sending of the DU. However, in some scenarios, uplink sending of the MT is later than downlink sending of the DU. Therefore, $\Delta_{UD}$ may also be a signed value (that is, $\Delta_{UD}$ may be a positive number or a negative number), and a specific positive or negative sign of $\Delta_{UD}$ depends on a strict definition of the time difference. In the embodiments of this application, an example in which $\Delta_{UD}$ is a time by which uplink sending of the MT is earlier than downlink receiving of the DU, and $\Delta_{UD}<0$ is used for description. Generally, $\Delta_{UU}=\Delta_{DD}-TA$.

Figure 11:
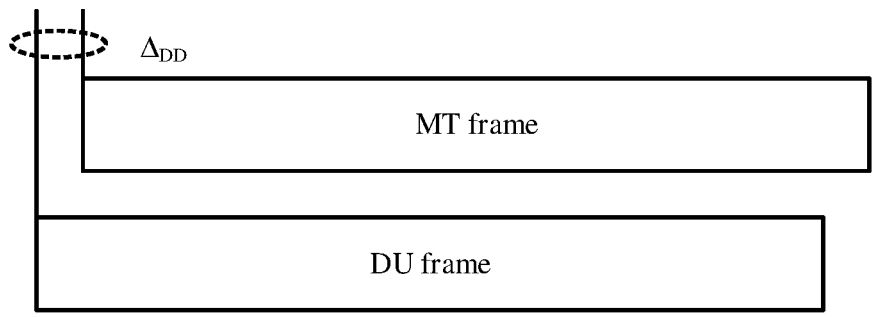
FIG. 11 is a schematic diagram of a time difference between an MT frame and a DU frame according to an embodiment of this application.

It should be noted that, the time difference shown in FIG. 10 is the time difference between the MT symbol and the DU symbol. However, in a protocol, a time difference between an MT resource and a DU resource generally indicates a time difference between an MT frame or subframe and a DU frame or subframe. $\Delta_{DD}$ is used as an example for description. As shown in FIG. 11, $\Delta_{DD}$ indicates an amount by which a start time of the MT frame is later than a start time of the DU frame, namely, the start time of the MT frame minus the start time of the DU frame. In the embodiments of this application, the time difference between the MT resource and the DU resource may be the time difference between the MT symbol and the DU symbol, the time difference between the MT frame and the DU frame, or the time difference between the MT subframe and the DU subframe, or certainly, may be a time difference of another time unit. This is not specifically limited herein.

Moreover, in addition to the time difference between the MT resource and the DU resource, a time for switching between MT transmission and DU transmission of the IAB node is also important information that affects resource multiplexing of the IAB node. The time for switching between MT transmission and DU transmission mainly includes a power amplifier off time required for switching from sending to receiving (namely, a time for switching from sending to receiving) or a power amplifier on time required for switching from receiving to sending (namely, a time for switching from receiving to sending). Switching between the MT and the DU may further include switching from receiving to receiving, or switching from sending to sending. For switching from receiving to receiving, when a difference between a received signal power of the MT and a received signal power of the DU is relatively small, a switching time may be ignored, or when a difference between two received signal powers is relatively large, a switching time may be relatively long. Similarly, for switching from sending to sending, when a difference between a transmit power of the MT and a transmit power of the DU is relatively small, a switching time may be ignored, or when a difference between two signal transmit powers is relatively large, a switching time may be relatively long. It should be understood that a time required for each of the foregoing types of switching is known to the JAB node, and a maximum time length required for each type of switching may also be defined in a protocol.

In the embodiments of this application, according to the method for determining guard interval information, the IAB node may determine guard interval information based on a time difference between the first resource and the second resource. Alternatively, the IAB node may determine guard interval information based on a time difference between the first resource and the second resource and a switching time, where the switching time is a time required by the IAB node to perform switching between receiving and sending. Specifically, when the IAB node performs switching between the first resource and the second resource, if the IAB node needs to perform switching between receiving and sending, for example, switching from an MT downlink resource to a DU downlink resource, the IAB node may determine the guard interval information based on the time difference between the first resource and the second resource and the switching time. If the IAB node does not need to perform switching between receiving and sending, for example, switching from an MT downlink resource to a DU uplink resource, the IAB node may determine the guard interval information based on the time difference between the first resource and the second resource.

When determining the guard interval information, the IAB node may define a guard symbol based on the DU or define a guard symbol based on the MT. The guard symbol defined based on the DU refers to a symbol unavailable to the MT in a specific direction (D/U/F) before or after the guard symbol when the DU performs transmission in the specific direction (D/U/F), and the guard symbol defined based on the MT refers to a symbol unavailable to the DU in a specific direction (D/U/F) before or after the guard symbol when the MT performs transmission in the specific direction (D/U/F).

For the guard symbol defined based on the DU, the following describes the guard interval information in detail with reference to specific scenarios.

Scenario 1: For the MT Downlink Symbol and the DU Downlink Symbol

Because the IAB node receives the MT downlink symbol and sends the DU downlink symbol, the IAB node needs to perform switching between receiving and sending or switching between sending and receiving when performing switching between the MT downlink symbol and the DU downlink symbol. The IAB node may determine, based on the time difference between the MT downlink resource and the DU downlink resource and a time t1 for switching from receiving to sending, a quantity of guard symbols before the DU downlink symbol, and determine, based on the time difference between the MT downlink resource and the DU downlink resource and a time t2 for switching from sending to receiving, a quantity of guard symbols after the DU downlink symbol. The time difference $\Delta_{DD}$ between the MT downlink symbol and the DU downlink symbol is used as an example for description below. The quantity of guard symbols before the DU resource is a symbol quantity a corresponding to t1+$\Delta_{DD}$, and the quantity of guard symbols after the DU resource is a symbol quantity b corresponding to t2−$\Delta_{DD}$. Therefore, the guard interval information may be {a, b}.

Figure 12:
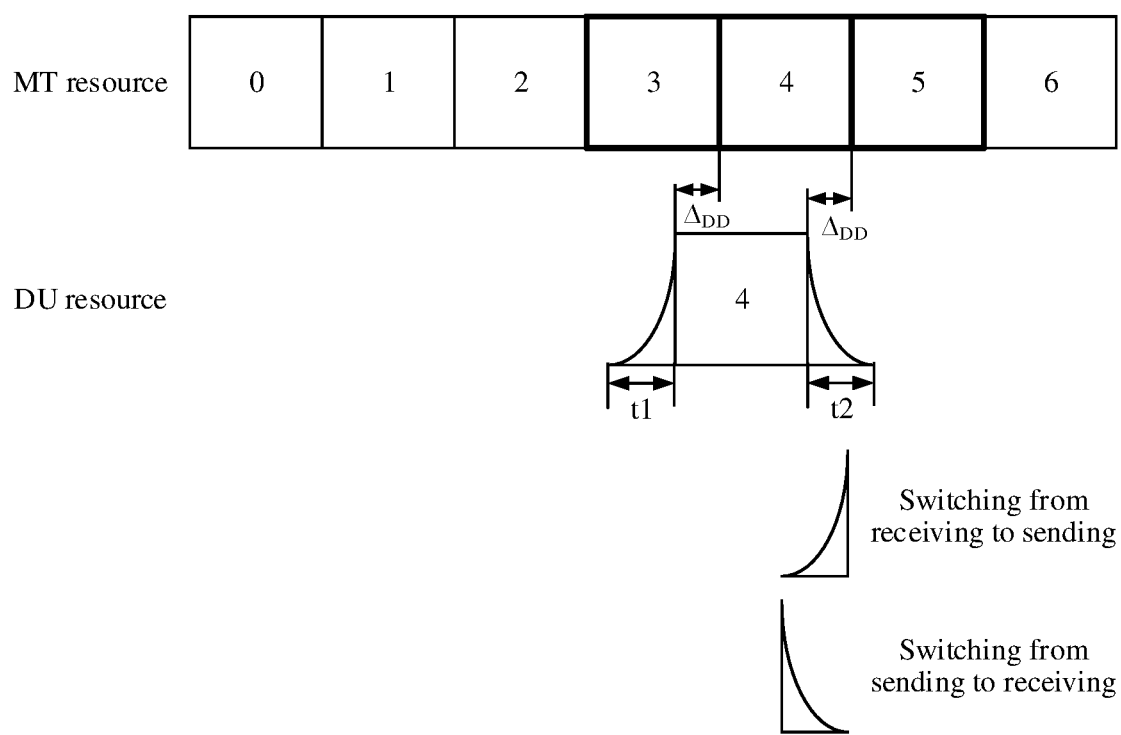
FIG. 12 is a schematic diagram of guard symbols before and after a DU symbol according to an embodiment of this application.

In an example description, if t1+$\Delta_{DD}$ is not greater than a length of one symbol, $\Delta_{DD}$ is less than t2, and t2−$\Delta_{DD}$ is not greater than the length of the symbol, that is, $$a = \left\lceil \frac{t1 + \Delta_{DD}}{\Delta t} \right\rceil = 1 \text{ and}$$
$$b = \left\lceil \frac{t2 - \Delta_{DD}}{\Delta t} \right\rceil = 1,$$

where in the embodiments of this application, $\Delta t$ may be the length of the symbol, the quantity of guard symbols before the DU downlink symbol may be defined as 1, the quantity of guard symbols after the DU symbol may be defined as 1, and the guard interval information may be defined as {1, 1}. When the DU uses the symbol 4, at the MT, in addition to a symbol 4 having an overlapping index, a symbol 3 and a symbol 5 are also unavailable, as shown in FIG. 12.

Figure 13:
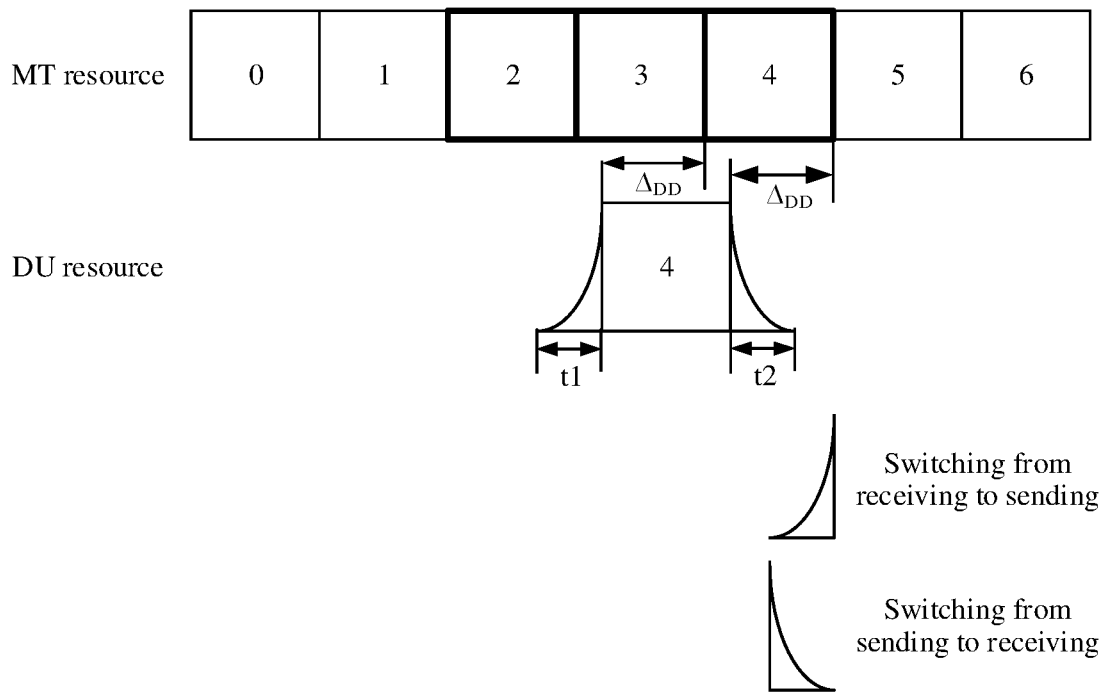
FIG. 13 is a schematic diagram of guard symbols before and after a DU symbol according to an embodiment of this application.

In another example description, if t1+$\Delta_{DD}$ is greater than a length of one symbol and is not greater than a length of two symbols, and $\Delta_{DD}$ is greater than t2, that is, $$a = \left\lceil \frac{t1 + \Delta_{DD}}{\Delta t} \right\rceil = 2 \text{ and}$$
$$b = \left\lceil \frac{t2 - \Delta_{DD}}{\Delta t} \right\rceil = 0,$$

the quantity of guard symbols after the DU resource may be 0. Therefore, the quantity of guard symbols before the DU symbol may be defined as 2, the quantity of guard symbols after the DU symbol may be defined as 0, and the guard interval information may be defined as {2, 0}. When the DU uses the symbol 4, at the MT, in addition to a symbol 4 having an overlapping index, a symbol 2 and a symbol 3 are also unavailable, and a symbol 5 is not affected by transmission on the symbol 4, as shown in FIG. 13.

Figure 14:
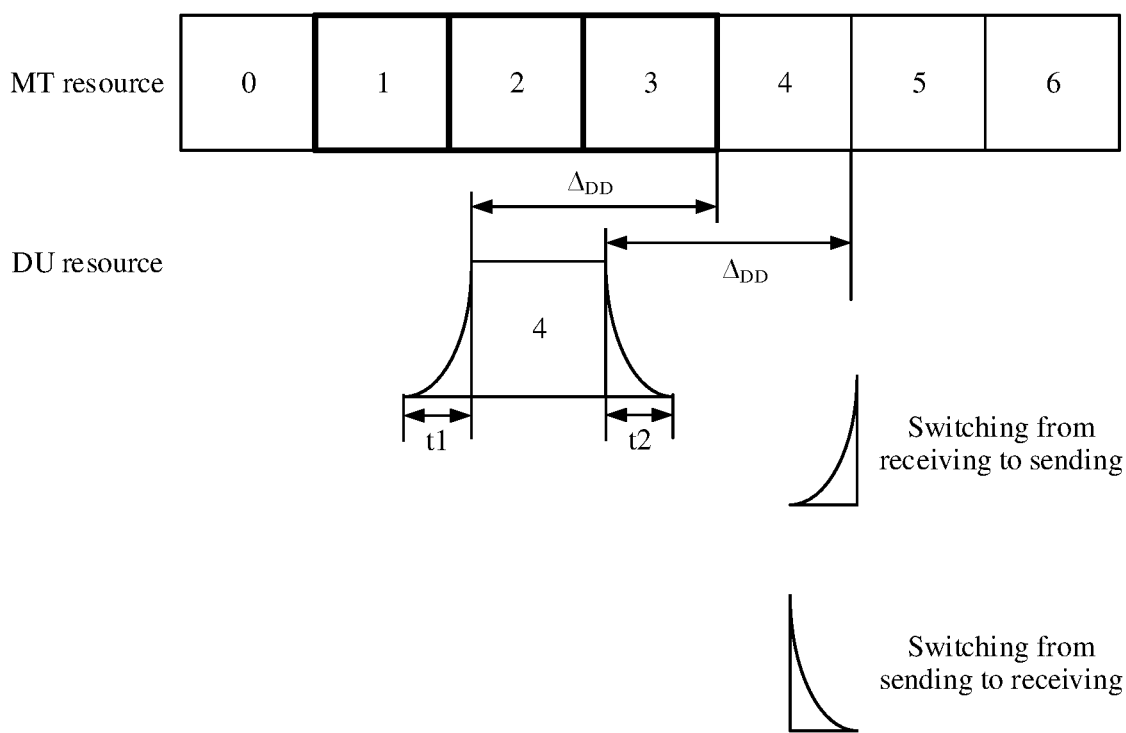
FIG. 14 is a schematic diagram of guard symbols before and after a DU symbol according to an embodiment of this application.

In still another example description, if the time difference between the MT resource and the DU resource is larger, an MT symbol having a same index as the DU symbol may be available. In this case, the quantity of guard symbols after the DU symbol may be denoted as a negative number. For example, if t1+$\Delta_{DD}$ is greater than a length of two symbols and is not greater than a length of three symbols, $\Delta_{DD}$ is greater than t2, and |t2−$\Delta_{DD}$| is greater than a length of one symbol, that is, $$a = \left\lceil \frac{t1 + \Delta_{DD}}{\Delta t} \right\rceil = 3 \text{ and } b = \left\lceil \frac{t2 - \Delta_{DD}}{\Delta t} \right\rceil = -1,$$

the quantity of guard symbols before the DU symbol may be defined as 3, the quantity of guard symbols after the DU symbol may be defined as −1, and the guard interval information may be defined as {3, −1}. When the DU uses the symbol 4, at the MT, a symbol 4 having an overlapping index is available, and symbols 1 to 3 are unavailable, as shown in FIG. 14.

Scenario 2: For the MT Downlink Symbol and the DU Uplink Symbol

Because the IAB node receives the MT downlink symbol and the DU uplink symbol, the IAB node may determine, based on the time difference between the MT downlink resource and the DU uplink resource and a switching time t3 for switching from MT receiving to DU receiving, a quantity of guard symbols before the DU downlink symbol, and determine, based on the time difference between the MT downlink resource and the DU uplink resource and a time t4 for switching from DU receiving to MT receiving, the a quantity of guard symbols after the DU downlink symbol. The time difference $\Delta_{DU}$ between the MT downlink symbol and the DU downlink symbol is used as an example for description below. A quantity of guard symbols before the DU resource is a symbol quantity a corresponding to t3+$\Delta_{DU}$, and the quantity of guard symbols after the DU resource is a symbol quantity b corresponding to t4−$\Delta_{DU}$. Therefore, the guard interval information may be {a, b}.

The time for switching from MT receiving to DU receiving may be the same as the time for switching from DU receiving to MT receiving, that is, t3 may be equal to t4.

Figure 15:
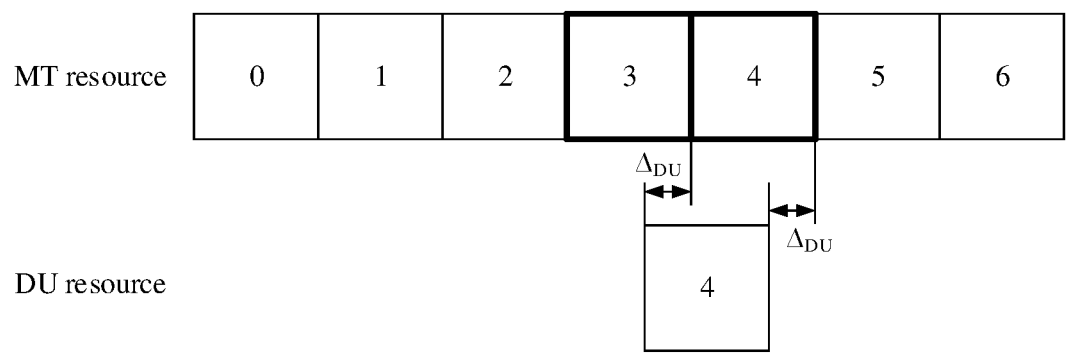
FIG. 15 is a schematic diagram of guard symbols before and after a DU symbol according to an embodiment of this application.

In an implementation, it takes a relatively short time to perform switching from receiving to receiving. Therefore, the time for switching from receiving to receiving may be ignored, that is, t3 and t4 may be equal to 0. In an example description, if t3+$\Delta_{DU}$ is not greater than a length of one symbol, and t4−$\Delta_{DU}$ is not greater than the length of the symbol, that is, $$a = \left\lceil \frac{t3 + \Delta_{DU}}{\Delta t} \right\rceil = 1 \text{ and } b = \left\lceil \frac{t4 - \Delta_{DD}}{\Delta t} \right\rceil = 0,$$

where $\Delta t$ may be the length of the symbol, the quantity of guard symbols before the DU symbol may be defined as 1, the quantity of guard symbols after the DU symbol may be defined as 0, and the guard interval information may be defined as {1, 0}. When the DU uses the symbol 4, at the MT, in addition to a symbol 4 having an overlapping index, a symbol 3 is also unavailable, as shown in FIG. 15.

Figure 16:
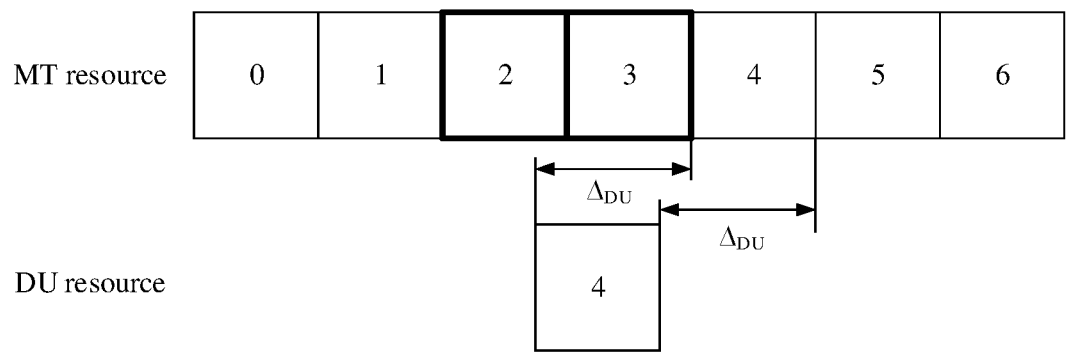
FIG. 16 is a schematic diagram of guard symbols before and after a DU symbol according to an embodiment of this application.

In another example description, if the time difference between the MT resource and the DU resource is larger, an MT symbol having a same index as the DU symbol may be available. In this case, the quantity of guard symbols after the DU symbol may be denoted as a negative number. For example, if t3+$\Delta_{DU}$ is greater than a length of one symbol and is not greater than a length of two symbols, and t4−$\Delta_{DU}$ is greater than the length of the symbol, that is, $$a = \left\lceil \frac{t3 + \Delta_{DD}}{\Delta t} \right\rceil = 2 \text{ and } b = \left\lceil \frac{t4 - \Delta_{DD}}{\Delta t} \right\rceil = -1,$$

the quantity of guard symbols after the DU resource may be a negative number. Therefore, the quantity of guard symbols before the DU symbol may be defined as 2, the quantity of guard symbols after the DU symbol may be defined as −1, and the guard interval information may be defined as {2, −1}. When the DU uses the symbol 4, at the MT, a symbol 4 having an overlapping index is not affected and is available, and a symbol 2 and a symbol 3 are unavailable, as shown in FIG. 16.

Scenario 3: For the MT Uplink Symbol and the DU Uplink Symbol

Because the IAB node sends the MT uplink symbol and receives the DU uplink symbol, the IAB node needs to perform switching between receiving and sending or switching between sending and receiving when performing switching between the MT uplink symbol and the DU uplink symbol. The IAB node may determine, based on the time difference between the MT uplink resource and the DU uplink resource and a time t2 for switching from sending to receiving, a quantity of guard symbols before the DU uplink symbol, and determine, based on the time difference between the MT uplink resource and the DU uplink resource and a time t1 for switching from receiving to sending, a quantity of guard symbols after the DU uplink symbol. The time difference $\Delta_{UU}$ between the MT uplink symbol and the DU uplink symbol is used as an example for description below. The quantity of guard symbols before the DU resource is a symbol quantity a corresponding to t2−$\Delta_{UU}$, and the quantity of guard symbols after the DU resource is a symbol quantity b corresponding to t1+$\Delta_{UU}$. Therefore, the guard interval information may be {a, b}.

Figure 17:
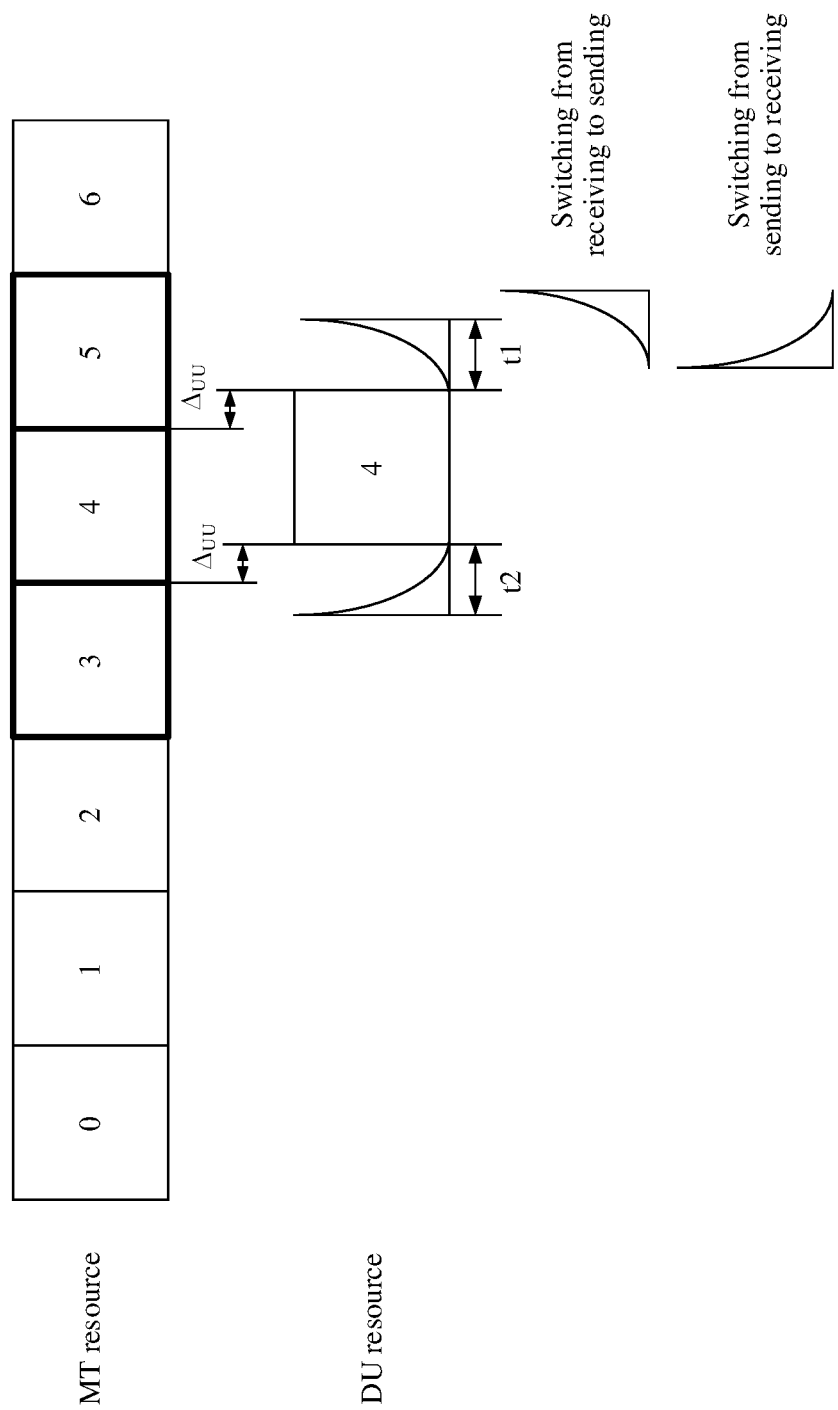
FIG. 17 is a schematic diagram of guard symbols before and after a DU symbol according to an embodiment of this application.

In an example description, if t1+$\Delta_{UU}$ is not greater than a length of one symbol, $\Delta_{UU}$ is less than t2, and t2−$\Delta_{UU}$ is not greater than the length of the symbol, that is, $$b = \left\lceil \frac{t1 + \Delta_{UU}}{\Delta t} \right\rceil = 1 \text{ and } a = \left\lceil \frac{t2 - \Delta_{UU}}{\Delta t} \right\rceil = 1,$$

where $\Delta t$ may be the length of the symbol, the quantity of guard symbols before the DU symbol may be defined as 1, the quantity of guard symbols after the DU symbol may be defined as 1, and the guard interval information may be defined as {1,1}. When the DU uses the symbol 4, at the MT, in addition to a symbol 4 having an overlapping index, a symbol 3 and a symbol 5 are also unavailable, as shown in FIG. 17.

Figure 18:
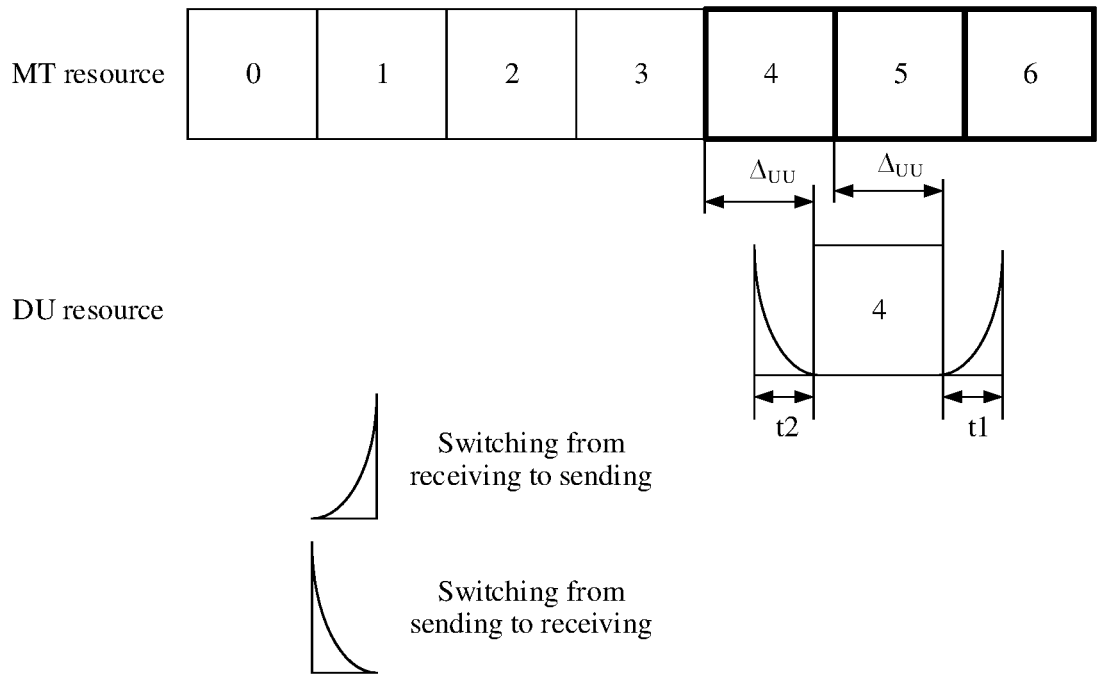
FIG. 18 is a schematic diagram of guard symbols before and after a DU symbol according to an embodiment of this application.

In another example description, if t1+$\Delta_{UU}$ is greater than a length of one symbol and is not greater than a length of two symbols, and $\Delta_{UU}$ is greater than t2, that is, $$b = \left\lceil \frac{t1 + \Delta_{UU}}{\Delta t} \right\rceil = 2 \text{ and } a = \left\lceil \frac{t2 - \Delta_{UU}}{\Delta t} \right\rceil = 0,$$

the quantity of guard symbols before the DU resource may be 0. Therefore, the quantity of guard symbols before the DU symbol may be defined as 0, the quantity of guard symbols after the DU symbol may be defined as 2, and the guard interval information may be defined as {0, 2}. When the DU uses the symbol 4, at the MT, in addition to a symbol 4 having an overlapping index, a symbol 5 and a symbol 6 are also unavailable, and a symbol 3 is not affected by transmission on the symbol 4, as shown in FIG. 18.

Figure 19:
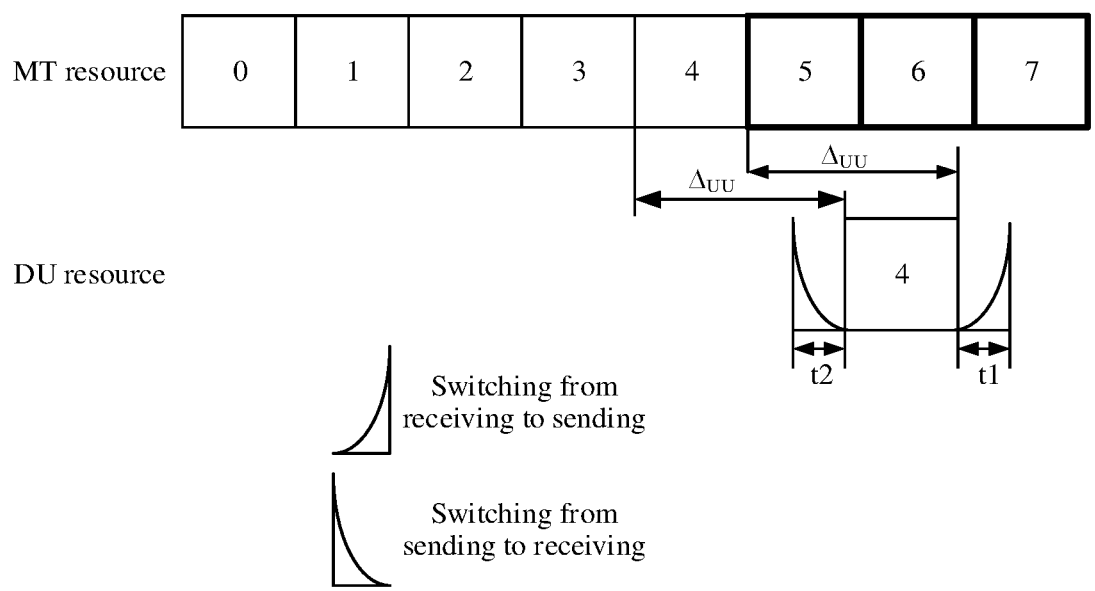
FIG. 19 is a schematic diagram of guard symbols before and after a DU symbol according to an embodiment of this application.

In still another example description, if the time difference between the MT resource and the DU resource is larger, an MT symbol having a same index as the DU symbol may be available. In this case, the quantity of guard symbols before the DU symbol may be denoted as a negative number. For example, if t1+$\Delta_{UU}$ is greater than a length of two symbols and is not greater than a length of three symbols, $\Delta_{UU}$ is greater than t2, and |t2−$\Delta_{UU}$| is greater than a length of one symbol, that is, $$b = \left\lceil \frac{t1 + \Delta_{UU}}{\Delta t} \right\rceil = 3 \text{ and } a = \left\lceil \frac{t2 - \Delta_{UU}}{\Delta t} \right\rceil = -1,$$

the quantity of guard symbols before the DU symbol may be defined as −1, the quantity of guard symbols after the DU symbol may be defined as 3, and the guard interval information may be defined as {−1, 3}. When the DU uses the symbol 4, at the MT, a symbol 4 having an overlapping index is available, and symbols 5 to 7 are unavailable, as shown in FIG. 19.

Scenario 4: For the MT Uplink Symbol and the DU Downlink Symbol

Because the IAB node sends the MT uplink symbol and the DU downlink symbol, the IAB node may determine, based on the time difference between the MT uplink resource and the DU downlink resource and a time t5 for switching from MT sending to DU sending, guard interval information before the DU uplink symbol, and determine, based on the time difference between the MT uplink resource and the DU downlink resource and a time t6 for switching from DU sending to MT sending, guard interval information after the DU uplink symbol. The time difference $\Delta_{DU}$ between the MT uplink symbol and the DU downlink symbol is used as an example for description below. A quantity of guard symbols before the DU resource is a symbol quantity a corresponding to t5−$\Delta_{UD}$, and a quantity of guard symbols after the DU resource is a symbol quantity b corresponding to t6+$\Delta_{UD}$. Therefore, the guard interval information may be {a, b}.

The time for switching from MT sending to DU sending may be the same as the time for switching from DU sending to MT sending, that is, t5 may be equal to t6.

In an implementation, it takes a relatively short time to perform switching from sending to sending. Therefore, the time for switching from sending to sending may be ignored, that is, t5 and t6 may be equal to 0.

Figure 20:
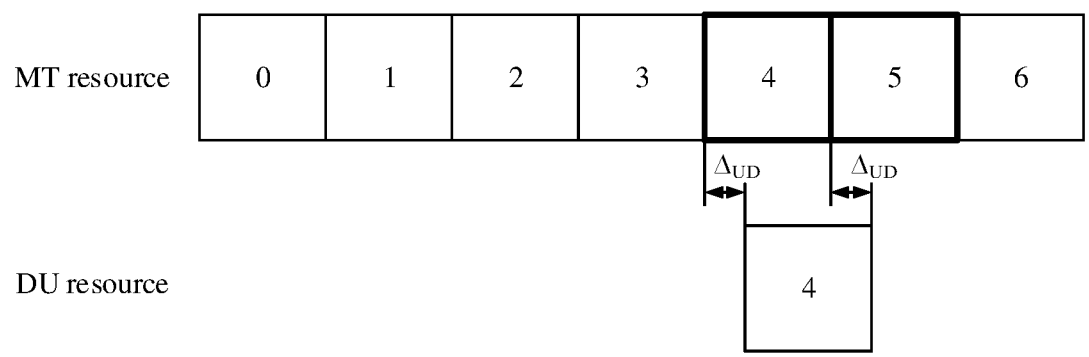
FIG. 20 is a schematic diagram of guard symbols before and after a DU symbol according to an embodiment of this application.

In an example description, if $\Delta_{UD}$ is not greater than a length of one symbol, that is, $$a = \left\lceil \frac{t5 - \Delta_{UD}}{\Delta t} \right\rceil = 0 \text{ and } b = \left\lceil \frac{t6 + \Delta_{UD}}{\Delta t} \right\rceil = 1,$$

where $\Delta t$ may be the length of the symbol, the quantity of guard symbols before the DU symbol may be defined as 0, the quantity of guard symbols after the DU symbol may be defined as 1, and the guard interval information may be defined as {0, 1}. When the DU uses the symbol 4, at the MT, in addition to a symbol 4 having an overlapping index, a symbol 5 is also unavailable, as shown in FIG. 20.

Figure 21:
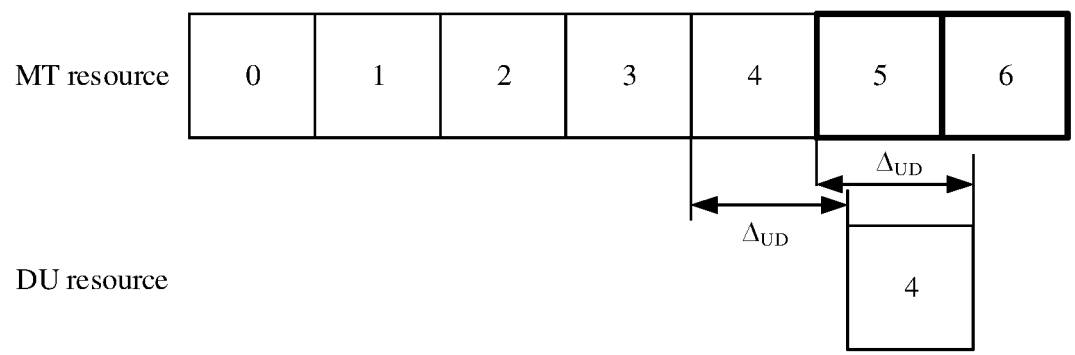
FIG. 21 is a schematic diagram of guard symbols before and after a DU symbol according to an embodiment of this application.

In another example description, if the time difference between the MT resource and the DU resource is larger, an MT symbol having a same index as the DU symbol may be available. In this case, the quantity of guard symbols before the DU symbol may be denoted as a negative number. For example, if $\Delta_{DU}$ is greater than a length of one symbol and is not greater than a length of two symbols, that is, $$a = \left\lceil \frac{t5 - \Delta_{UD}}{\Delta t} \right\rceil = -1 \text{ and } b = \left\lceil \frac{t6 + \Delta_{UD}}{\Delta t} \right\rceil = 2,$$

the quantity of guard symbols before the DU resource may be a negative number. Therefore, the quantity of guard symbols before the DU symbol may be defined as −1, the quantity of guard symbols after the DU symbol may be defined as 2, and the guard interval information may be defined as {−1, 2}. When the DU uses the symbol 4, at the MT, a symbol 4 having an overlapping index is not affected and is available, and symbols 5 and 6 are unavailable, as shown in FIG. 21.

The foregoing describes the guard symbol defined based on the DU in the four scenarios. When a DU symbol is used, an MT guard interval required by the DU symbol is represented as {a, b}. If a DU symbol L is used, a symbol (L−a) to a symbol (L+b) of the MT are affected by the symbol and cannot be used. When (L−a) or (L+b) is less than 0, a modulo operation is performed on (L−a) or (L+b) based on a quantity of symbols in a slot, and a result obtained after the modulo operation is used as an index of an unavailable symbol in a previous slot. For example, when L=0, and the guard interval information is {1, 1}, it is learned that a symbol −1 to a symbol 2 of the MT are affected by the DU symbol and are unavailable. Assuming that there are 14 symbols in a slot, a modulo operation should be performed on −1 by 14, to obtain 13. Therefore, a result is that a symbol 13 in a previous slot to a symbol 2 in a current slot are affected by the DU symbol and are unavailable.

Correspondingly, when (L−a) or (L+b) is greater than M−1 (assuming that a quantity of symbols in a slot is M), a modulo operation should also be performed on a result, and a result obtained after the modulo operation is considered as a symbol in a next slot. For example, when L=13, and the guard interval information is {1, 1}, it is learned that a symbol 12 to a symbol 14 of the MT are affected by the DU symbol and are unavailable. Assuming that there are 14 symbols in a slot, a modulo operation should be performed on 14 by 14, to obtain 0. Therefore, a result is that a symbol 12 in a current slot to a symbol 0 in a next slot are affected by the DU symbol and are unavailable.

For the guard symbol defined based on the MT, the following describes the guard interval information in detail with reference to specific scenarios.

Scenario 1: For the MT Downlink Symbol and the DU Downlink Symbol

Because the IAB node receives the MT downlink symbol and sends the DU downlink symbol, the IAB node needs to perform switching between receiving and sending or switching between sending and receiving when performing switching between the MT downlink symbol and the DU downlink symbol. The IAB node may determine, based on the time difference between the MT downlink resource and the DU downlink resource and a time t1 for switching from receiving to sending, a quantity of guard symbols after the MT downlink symbol, and determine, based on the time difference between the MT downlink resource and the DU downlink resource and a time t2 for switching from sending to receiving, a quantity of guard symbols before the MT downlink symbol. The time difference $\Delta_{DD}$ between the MT downlink symbol and the DU downlink symbol is used as an example for description below. The quantity of guard symbols after the MT resource is a symbol quantity d corresponding to $t1+\Delta_{DD}$, and the quantity of guard symbols before the MT resource is a symbol quantity c corresponding to $t2-\Delta_{DD}$. Therefore, the guard interval information may be {c, d}.

Figure 22:
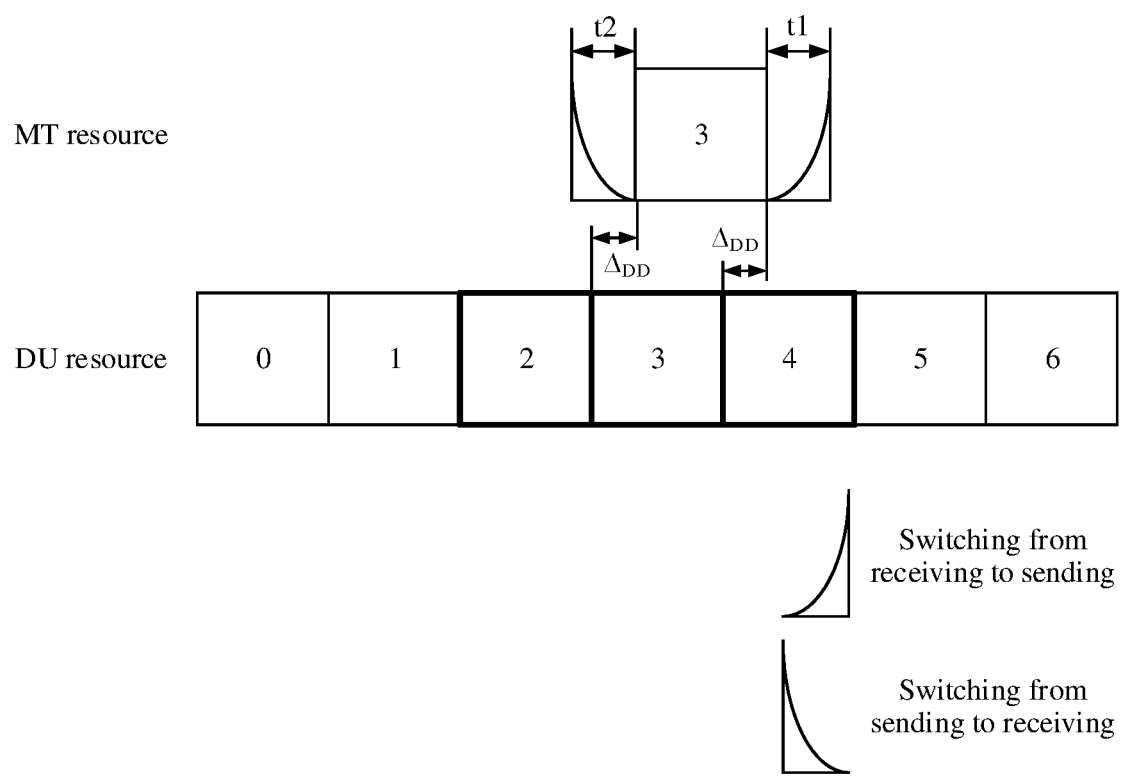
FIG. 22 is a schematic diagram of guard symbols before and after an MT symbol according to an embodiment of this application.

In an example description, if $t1+\Delta_{DD}$ is not greater than a length of one symbol, $\Delta_{DD}$ is less than t2, and $t2-\Delta_{DD}$ is not greater than the length of the symbol, that is, $$c = \left\lceil \frac{t2 - \Delta_{DD}}{\Delta t} \right\rceil = 1 \text{ and } d = \left\lceil \frac{t1 + \Delta_{DD}}{\Delta t} \right\rceil = 1,$$

where in the embodiments of this application, $\Delta t$ may be the length of the symbol, the quantity of guard symbols before the MT symbol may be defined as 1, the quantity of guard symbols after the MT symbol may be defined as 1, and the guard interval information may be defined as {1, 1}. When the MT uses a symbol 3, at the DU, in addition to the symbol 3 having an overlapping index, the symbol 2 and the symbol 4 are also unavailable, as shown in FIG. 22.

Figure 23:
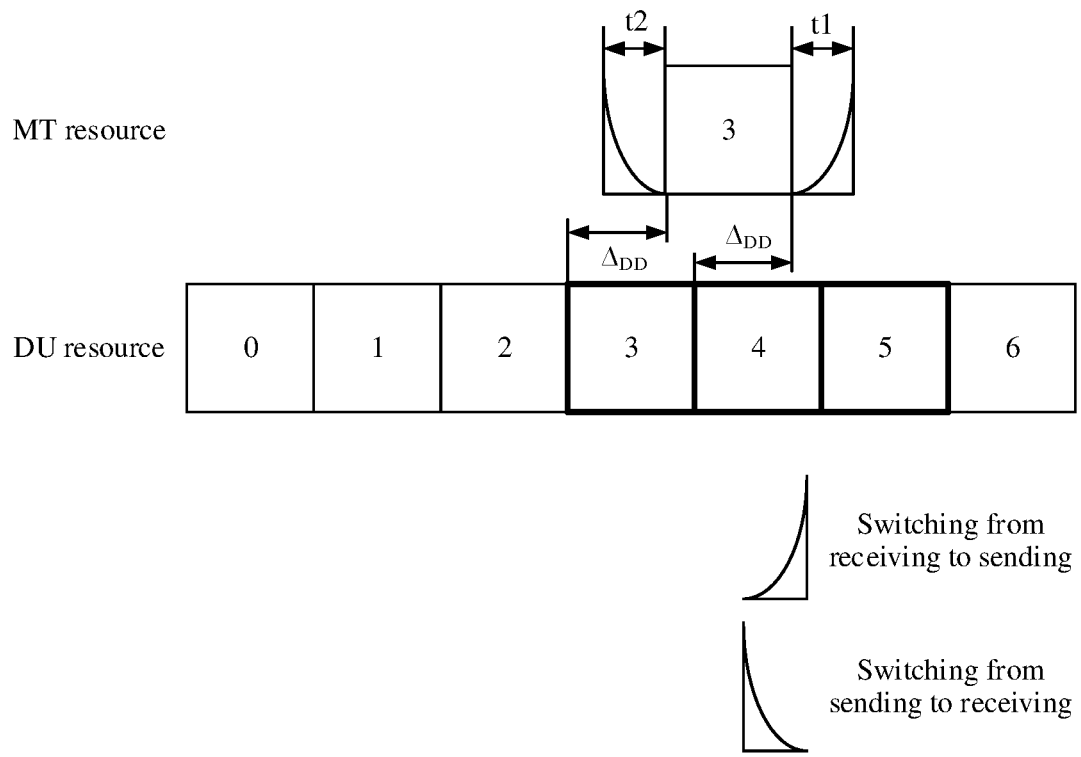
FIG. 23 is a schematic diagram of guard symbols before and after an MT symbol according to an embodiment of this application.

In another example description, if $t1+\Delta_{DD}$ is greater than a length of one symbol and is not greater than a length of two symbols, and $\Delta_{DD}$ is greater than t2, that is, $$c = \left\lceil \frac{t2 - \Delta_{DD}}{\Delta t} \right\rceil = 0 \text{ and } d = \left\lceil \frac{t1 + \Delta_{DD}}{\Delta t} \right\rceil = 2,$$

the quantity of guard symbols before the MT resource may be 0. Therefore, the quantity of guard symbols before the MT symbol may be defined as 0, the quantity of guard symbols after the MT symbol may be defined as 2, and the guard interval information may be defined as {0, 2}. When the MT uses a symbol 3, at the DU, in addition to the symbol 3 having an overlapping index, the symbol 4 and the symbol 5 are also unavailable, and the symbol 2 is not affected by transmission on the symbol 3, as shown in FIG. 23.

Figure 24:
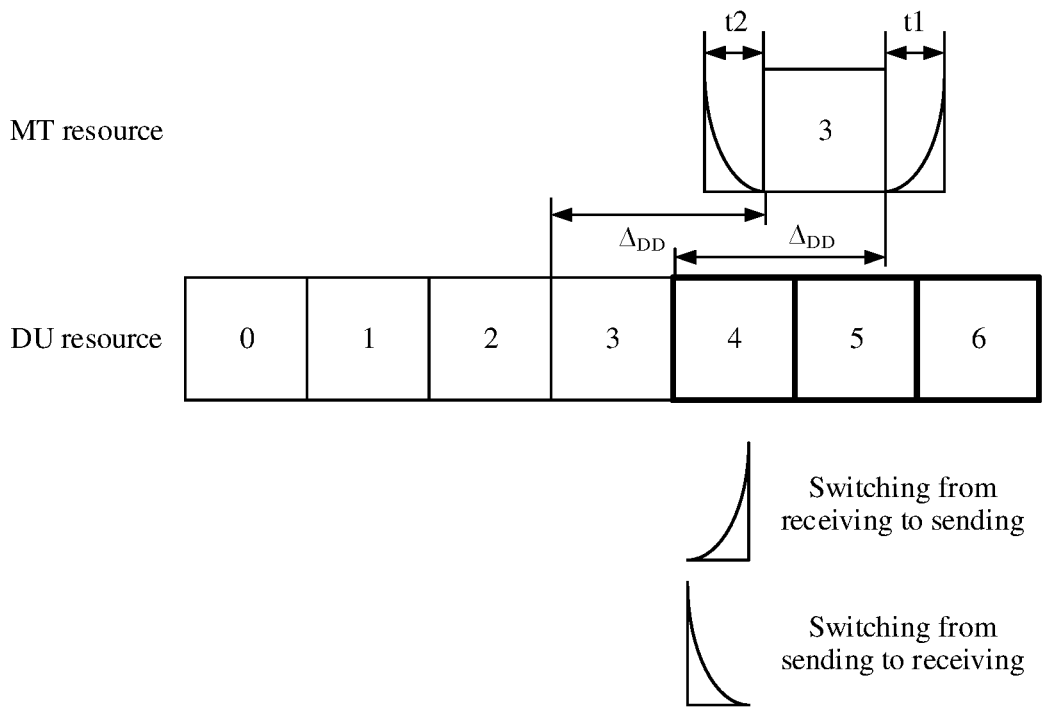
FIG. 24 is a schematic diagram of guard symbols before and after an MT symbol according to an embodiment of this application.

In another example description, if the time difference between the MT resource and the DU resource is larger, a DU symbol having a same index as the MT symbol may be available. In this case, the quantity of guard symbols before the MT symbol may be denoted as a negative number. For example, if $\Delta_{DD}$ is greater than a length of two symbols and is not greater than a length of three symbols, $\Delta_{DD}$ is greater than t2, and $|t2-\Delta_{DD}|$ is greater than a length of one symbol, that is, $$c = \left\lceil \frac{t2 - \Delta_{DD}}{\Delta t} \right\rceil = -1 \text{ and } d = \left\lceil \frac{t1 + \Delta_{DD}}{\Delta t} \right\rceil = 3,$$

the quantity of guard symbols after the MT symbol may be defined as 3, the quantity of guard symbols before the MT symbol may be defined as −1, and the guard interval information may be defined as {−1, 3}. When the MT uses a symbol 3, at the DU, the symbol 3 having an overlapping index is available, and the symbols 4 to 6 are unavailable, as shown in FIG. 24.

Scenario 2: For the MT Downlink Symbol and the DU Uplink Symbol

Because the IAB node receives the MT downlink symbol and the DU uplink symbol, the IAB node may determine, based on the time difference between the MT downlink resource and the DU uplink resource and a switching time t4 for switching from DU receiving to MT receiving, guard interval information before the MT downlink symbol, and determine, based on the time difference between the MT downlink resource and the DU uplink resource and a time t3 for switching from MT receiving to DU receiving, guard interval information after the MT downlink symbol. The time difference $\Delta_{DU}$ between the MT downlink symbol and the DU downlink symbol is used as an example for description below. A quantity of guard symbols before the MT resource is a symbol quantity c corresponding to $t4-\Delta_{DU}$, and a quantity of guard symbols after the MT resource is a symbol quantity d corresponding to $t3-\Delta_{DU}$. Therefore, the guard interval information may be {c, d}.

Figure 25:
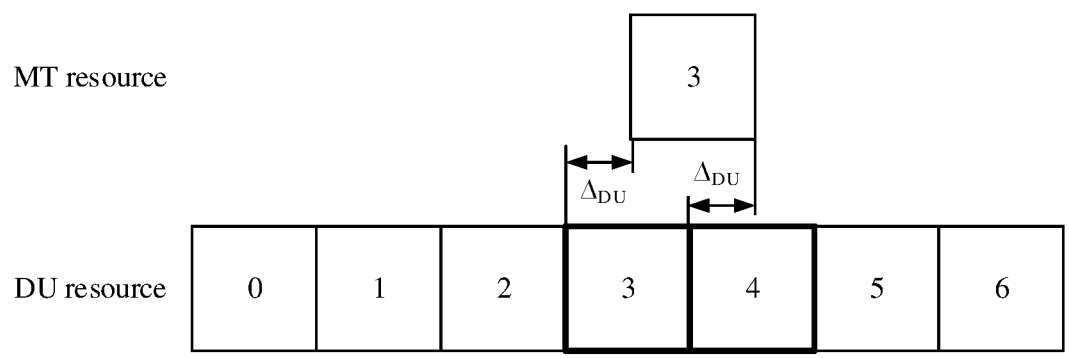
FIG. 25 is a schematic diagram of guard symbols before and after an MT symbol according to an embodiment of this application.

In an example description, if $\Delta_{DU}$ is not greater than a length of one symbol, and $\Delta_{DU}$ is not greater than the length of the symbol, that is, $$c = \left\lceil \frac{t4 - \Delta_{DU}}{\Delta t} \right\rceil = 0 \text{ and } d = \left\lceil \frac{t3 + \Delta_{DU}}{\Delta t} \right\rceil = 1,$$

where $\Delta t$ may be the length of the symbol, the quantity of guard symbols before the MT symbol may be defined as 0, the quantity of guard symbols after the MT symbol may be defined as 1, and the guard interval information may be defined as {0, 1}. When the MT uses a symbol 3, at the DU in addition to the symbol 3 having an overlapping index, the symbol 4 is also unavailable, as shown in FIG. 25.

Figure 26:
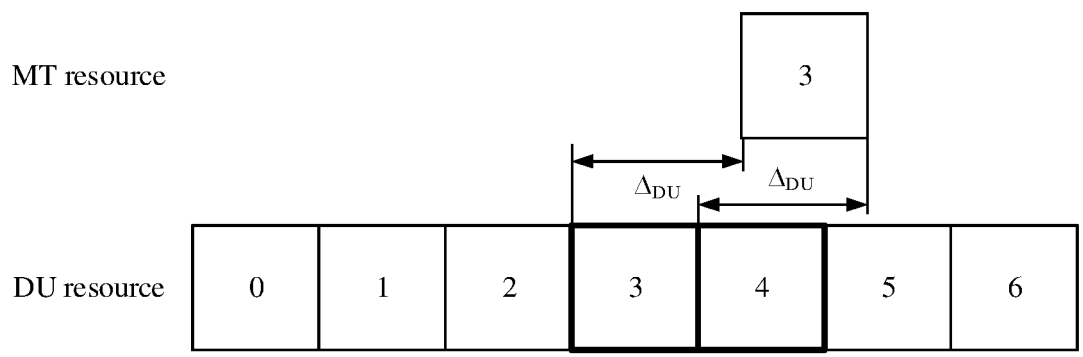
FIG. 26 is a schematic diagram of guard symbols before and after an MT symbol according to an embodiment of this application.

In another example description, if the time difference between the MT resource and the DU resource is larger, a DU symbol having a same index as the MT symbol may be available. In this case, the quantity of guard symbols before the MT symbol may be denoted as a negative number. For example, if $\Delta_{DU}$ is greater than a length of one symbol and is not greater than a length of two symbols, that is, $$c = \left\lceil \frac{t4 - \Delta_{DU}}{\Delta t} \right\rceil = -1 \text{ and } d = \left\lceil \frac{t3 + \Delta_{DU}}{\Delta t} \right\rceil = 2,$$

the quantity of guard symbols before the MT resource may be a negative number. Therefore, the quantity of guard symbols before an MT symbol may be defined as −1, the quantity of guard symbols after the MT symbol may be defined as 2, and the guard interval information may be defined as {−1, 2}. When the MT uses a symbol 3, at the DU, the symbol 3 having an overlapping index is not affected and is available, and the symbol 4 and the symbol 5 are unavailable, as shown in FIG. 26.

Scenario 3: For the MT Uplink Symbol and the DU Uplink Symbol

Because the IAB node sends the MT uplink symbol and receives the DU uplink symbol, the IAB node needs to perform switching between receiving and sending or switching between sending and receiving when performing switching between the MT uplink symbol and the DU uplink symbol. The IAB node may determine, based on the time difference between the MT uplink resource and the DU uplink resource and a time t2 for switching from sending to receiving, a quantity of guard symbols after the MT uplink symbol, and determine, based on the time difference between the MT uplink resource and the DU uplink resource and a time t1 for switching from receiving to sending, a quantity of guard symbols before the MT uplink symbol. The time difference $\Delta_{UU}$ between the MT uplink symbol and the DU uplink symbol is used as an example for description below. The quantity of guard symbols after the MT resource is a symbol quantity c corresponding to $t2-\Delta_{UU}$, and a quantity of guard symbols before the MT resource is a symbol quantity d corresponding to $t1+\Delta_{UU}$. Therefore, the guard interval information may be {c, d}.

Figure 27:
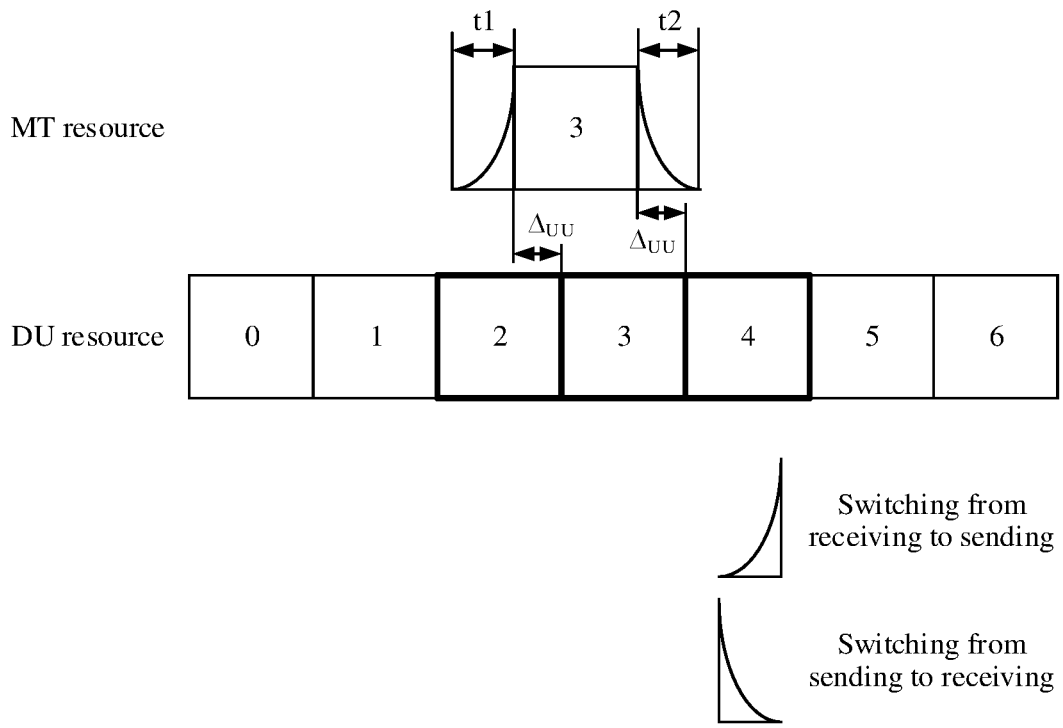
FIG. 27 is a schematic diagram of guard symbols before and after an MT symbol according to an embodiment of this application.

In an example description, if $t1+\Delta_{UU}$ is not greater than a length of one symbol, $\Delta_{UU}$ is less than t2, and $t2-\Delta_{UU}$ is not greater than the length of the symbol, that is, $$c = \left\lceil \frac{t1 + \Delta_{UU}}{\Delta t} \right\rceil = 1 \text{ and } d = \left\lceil \frac{t2 - \Delta_{UU}}{\Delta t} \right\rceil = 1,$$

where $\Delta t$ may be the length of the symbol, the quantity of guard symbols before the MT symbol may be defined as 1, the quantity of guard symbols after the MT symbol may be defined as 1, and the guard interval information may be defined as {1, 1}. When the MT uses a symbol 3, at the DU, in addition to the symbol 3 having an overlapping index, the symbol 2 and the symbol 4 are also unavailable, as shown in FIG. 27.

Figure 28:
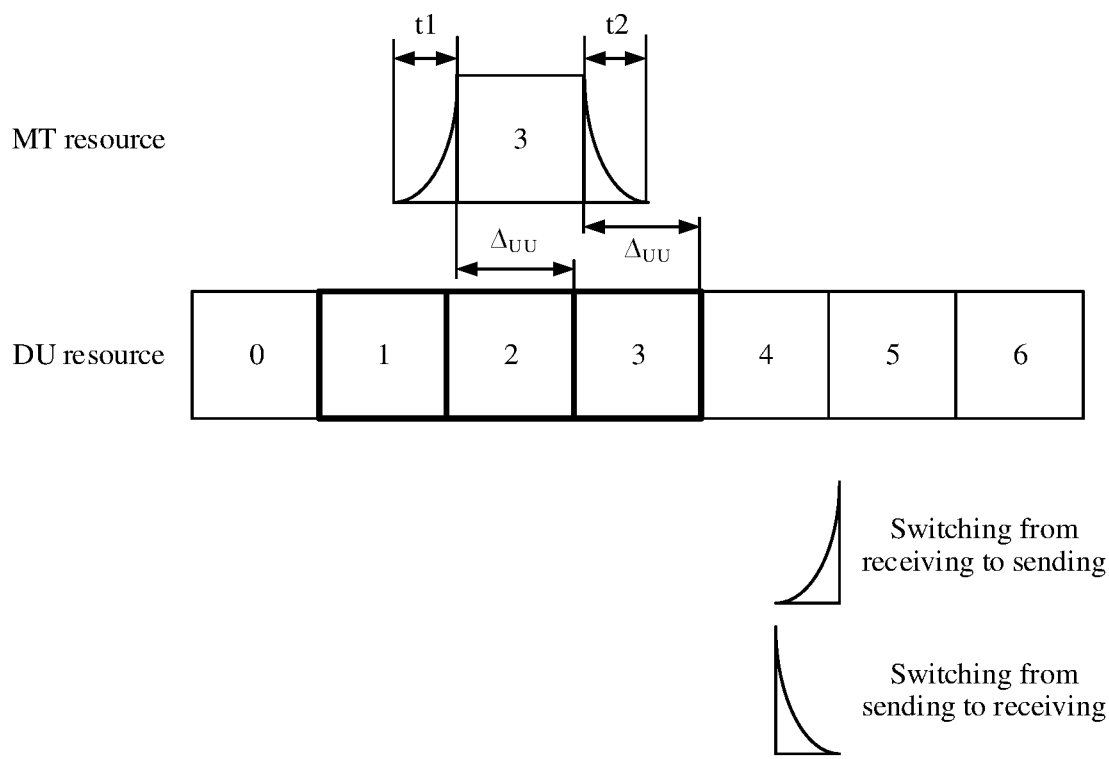
FIG. 28 is a schematic diagram of guard symbols before and after an MT symbol according to an embodiment of this application.

In another example description, if $t1+\Delta_{UU}$ is greater than a length of one symbol and is not greater than a length of two symbols, and $\Delta_{UU}$ is greater than t2, that is, $$c = \left\lceil \frac{t1 + \Delta_{UU}}{\Delta t} \right\rceil = 2 \text{ and } d = \left\lceil \frac{t2 - \Delta_{UU}}{\Delta t} \right\rceil = 0,$$

the quantity of guard symbols after the MT resource may be 0. Therefore, the quantity of guard symbols before the MT symbol may be defined as 2, the quantity of guard symbols after the MT symbol may be defined as 0, and the guard interval information may be defined as {2, 0}. When the MT uses a symbol 3, at the DU, in addition to the symbol 3 having an overlapping index, the symbol 1 and the symbol 2 are also unavailable, and the symbol 4 is not affected by transmission on the symbol 3, as shown in FIG. 28.

Figure 29:
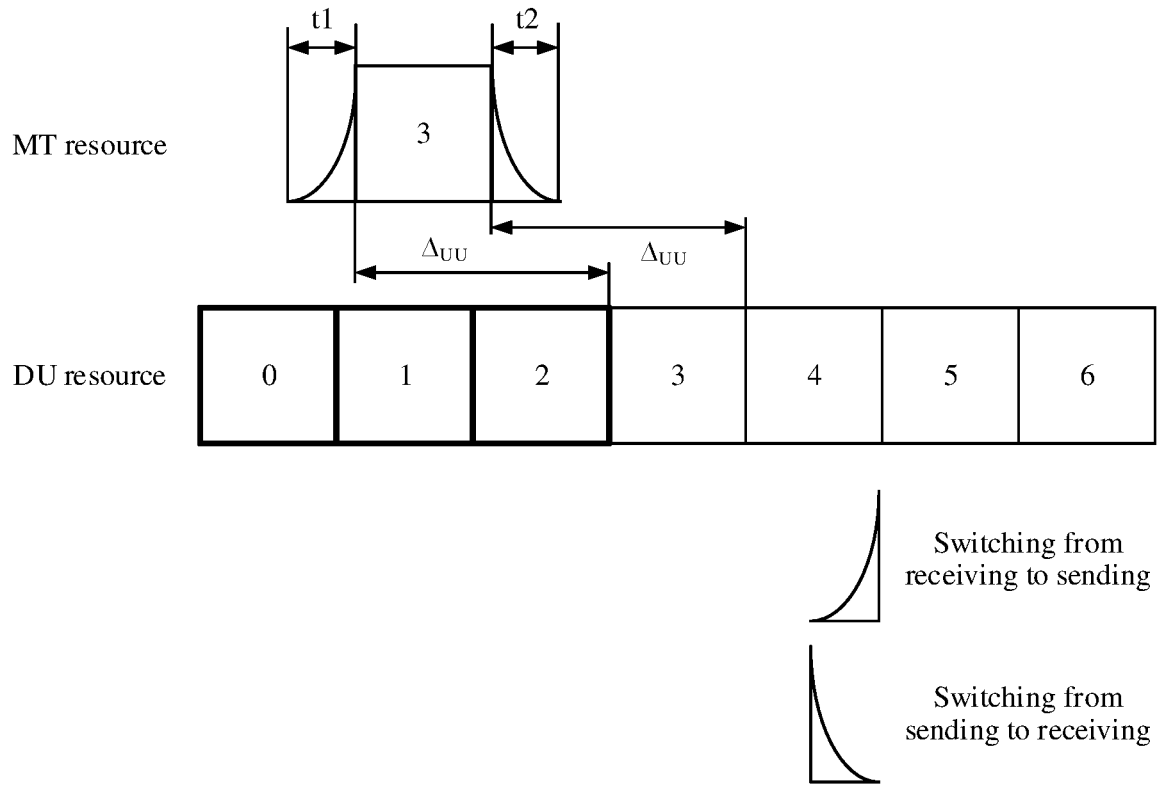
FIG. 29 is a schematic diagram of guard symbols before and after an MT symbol according to an embodiment of this application.

In still another example description, if the time difference between the MT resource and the DU resource is larger, a DU symbol having a same index as the MT symbol may be available. In this case, the quantity of guard symbols after the MT symbol may be denoted as a negative number. For example, if $t1+\Delta_{UU}$ is greater than a length of two symbols and is not greater than a length of three symbols, $\Delta_{UU}$ is greater than t2, and $|t2-\Delta_{UU}|$ is greater than a length of one symbol, that is, $$c = \left\lceil \frac{t1 + \Delta_{UU}}{\Delta t} \right\rceil = 3 \text{ and } d = \left\lceil \frac{t2 - \Delta_{UU}}{\Delta t} \right\rceil = -1,$$

the quantity of guard symbols before the MT symbol may be defined as 3, the quantity of guard symbols after the MT symbol may be defined as −1, and the guard interval information may be defined as {3, −1}. When the MT uses a symbol 3, at the DU, the symbol 3 having an overlapping index is available, and the symbols 0 to 2 are unavailable, as shown in FIG. 29.

Scenario 4: For the MT Uplink Symbol and the DU Downlink Symbol

Because the IAB node receives the MT uplink symbol and the DU downlink symbol, the IAB node does not need to perform switching between receiving and sending or switching between sending and receiving when performing switching between the MT uplink symbol and the DU downlink symbol. The IAB node may determine, based on the time difference between the MT uplink resource and the DU downlink resource and a time t6 for switching from DU sending to MT sending, guard interval information before the MT uplink symbol, and determine, based on the time difference between the MT uplink resource and the DU downlink resource and a time t5 for switching from MT sending to DU sending, guard interval information after the MT uplink symbol. The time difference $\Delta_{DU}$ between the MT uplink symbol and the DU downlink symbol is used as an example for description below. A quantity of guard symbols before the MT resource is a symbol quantity c corresponding to $t6+\Delta_{UD}$, and a quantity of guard symbols after the MT resource is a symbol quantity d corresponding to $t5-\Delta_{UD}$. Therefore, the guard interval information may be {c, d}.

Figure 30:
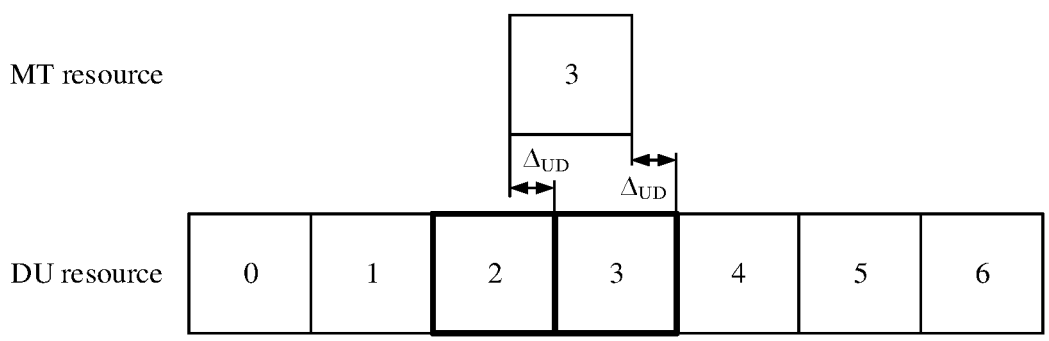
FIG. 30 is a schematic diagram of guard symbols before and after an MT symbol according to an embodiment of this application.

In an example description, if $\Delta_{UD}$ is not greater than a length of one symbol, that is, $$c = \left\lceil \frac{t6 + \Delta_{UD}}{\Delta t} \right\rceil = 1 \text{ and } d = \left\lceil \frac{t5 - \Delta_{UD}}{\Delta t} \right\rceil = 0,$$

where $\Delta t$ may be the length of the symbol, the quantity of guard symbols before the MT symbol may be defined as 1, the quantity of guard symbols after the MT symbol may be defined as 0, and the guard interval information may be defined as {1, 0}. When the MT uses a symbol 3, at the DU, in addition to the symbol 3 having an overlapping index, the symbol 2 is also unavailable, as shown in FIG. 30.

Figure 31:
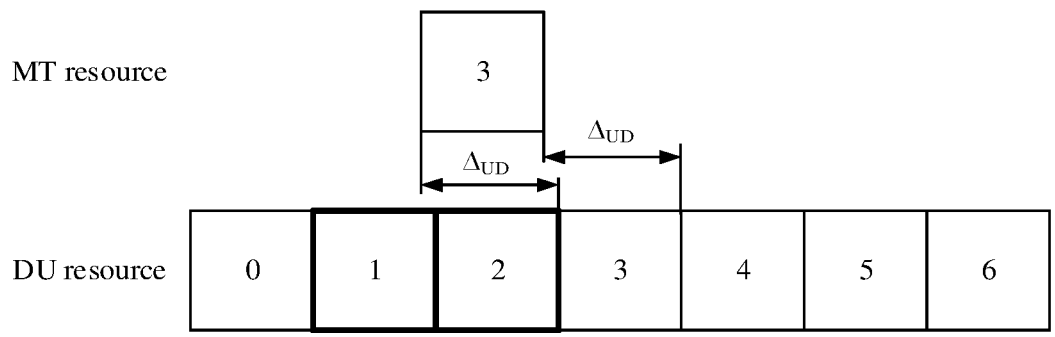
FIG. 31 is a schematic diagram of guard symbols before and after an MT symbol according to an embodiment of this application.

In another example description, if the time difference between the MT resource and the DU resource is larger, a DU symbol having a same index as the MT symbol may be available. In this case, the quantity of guard symbols after the MT symbol may be denoted as a negative number. For example, if $\Delta_{DU}$ is greater than a length of one symbol and is not greater than a length of two symbols, that is, $$c = \left\lceil \frac{t6 + \Delta_{UD}}{\Delta t} \right\rceil = 2 \text{ and } d = \left\lceil \frac{t5 - \Delta_{UD}}{\Delta t} \right\rceil = -1,$$

the quantity of guard symbols after the MT resource may be a negative number. Therefore, the quantity of guard symbols before the MT symbol may be defined as 2, the quantity of guard symbols after the MT symbol may be defined as −1, and the guard interval information may be defined as {2, −1}. When the MT uses a symbol 3, at the DU, the symbol 3 having an overlapping index is not affected and is available, and the symbol 1 and the symbol 2 are unavailable, as shown in FIG. 31.

The foregoing describes the guard symbol defined based on the MT in the four scenarios. When an MT symbol is used, a DU guard interval required by the MT symbol is represented as {c, d}. If an MT symbol H is used, a symbol (H−c) to a symbol (H+d) of the DU are affected by the symbol and cannot be used. When (H−c) or (H+d) is less than 0, a modulo operation is performed on a result based on a quantity of symbols in a slot, and a result obtained after the modulo operation is used as an index of an unavailable symbol in a previous slot. For example, when H=0, and the guard interval information is {1, 1}, it is learned that a symbol −1 to a symbol 2 of the DU are affected by the MT symbol and are unavailable. Assuming that there are 14 symbols in a slot, a modulo operation should be performed on −1 by 14, to obtain 13. Therefore, a result is that a symbol 13 in a previous slot to a symbol 2 in a current slot are affected by the MT symbol and are unavailable.

Correspondingly, when (H−c) or (H+d) is greater than M−1 (assuming that a quantity of symbols in a slot is M), a modulo operation should also be performed on a result, and a result obtained after the modulo operation is considered as a symbol in a next slot. For example, when H=13, and the guard interval information is {1, 1}, it is learned that a symbol 12 to a symbol 14 of the DU are affected by the MT symbol and are unavailable. Assuming that there are 14 symbols in a slot, a modulo operation should be performed on 14 by 14, to obtain 0. Therefore, a result is that a symbol 12 in a current slot to a symbol 0 in a next slot are affected by the MT symbol and are unavailable.

In the foregoing definitions, the guard symbols are all defined and sent in pairs, that is, a quantity of guard symbols during switching from the MT to the DU and a quantity of guard symbols during switching from the DU to the MT are both provided by using an array (for example, {1, 1}). It should be understood that the guard symbols during the two types of switching may also be separately defined and/or sent, and eight values of the quantity of guard symbols are provided based on the eight resource combinations.

Specifically, a quantity u of guard symbols during switching from the MT (downlink or uplink) to the DU (downlink or uplink) and a quantity v of guard symbols during switching from the DU (downlink or uplink) to the MT (downlink or uplink) may be defined in a protocol. The quantity u of guard symbols during switching from the MT to the DU indicates that if the last used symbol of the MT is a symbol H, the first possible DU available symbol after the symbol H is a symbol H+u+1; or if the first used symbol of the DU is a symbol L, the last possible MT available symbol before the symbol L is a symbol L−u−1. The quantity v of guard symbols during switching from the DU to the MT indicates that if the last used symbol of the DU is a symbol L, the first possible MT available symbol after the symbol L is a symbol L+v+1; or if the first used symbol of the MT is a symbol H, the last possible DU available symbol before the symbol H is a symbol H−v−1. As described throughout this document, when an index (that is, H+u+1, L−u−1, L+v+1, or H−v−1) of an available symbol is determined, a modulo operation may be performed on a quantity of symbols in a slot, to be applicable to a case in which an available symbol is determined across slots.

Methods for calculating u and v are the same as or similar to the foregoing method. It should be understood that, the method for calculating the quantity of guard symbols is merely an example. In practice, other factors may further need to be considered when the quantity of guard symbols is calculated. For example, a CP of a receive symbol may be discarded, or a CP length of a receive symbol is added to each resource difference (for example, $\Delta_{DU}$). It should be understood that, if the IAB node and the parent node/donor node each need to calculate the quantity of guard symbols, a definite calculation formula needs to be defined in a protocol. However, if only the IAB node needs to calculate a guard interval, a calculation method may be implemented by the IAB node.

It should be understood that DU or MT available symbols that are determined by using the foregoing method are all possible available symbols, because only impact of the last MT symbol and the first MT symbol on the DU symbol, or impact of the last DU symbol and the first DU symbol on the MT symbol is considered for the available symbols determined by using the foregoing method, and factors of other symbols are not considered.

In a possible implementation, a negative quantity of guard symbols is not defined in a protocol. In other words, when a calculated quantity of guard symbols is a negative number, the quantity of guard symbols is considered as 0.

It should be noted that FIG. 12 to FIG. 31 are based on specific subcarrier spacing and CP type assumptions. However, in different waveform parameters (numerologies), quantities of required guard symbols may be different. That is, in different numerologies, values of Δt may be different, and correspondingly obtained values of a and b are different. The subcarrier spacing and CP type assumptions may be defined in a protocol, or may be configured by the parent node or the donor node of the IAB node. The numerologies include information such as subcarrier spacing information and a CP type.

Further, if a subcarrier spacing and a CP type are defined in a protocol, there may be different subcarrier spacings and CP types in different frequency bands.

In a possible implementation, default waveform parameters in different frequency bands may be defined in a protocol, but the parent node of the IAB node or the donor node of the IAB node may modify the default waveform parameters by using configuration information.

In a possible implementation, the IAB node may determine an assumed subcarrier spacing and an assumed CP type based on other configured information, and the other configured information includes a subcarrier spacing and a CP type in a bandwidth part (bandwidth part, BWP), a maximum or minimum subcarrier spacing in all configured BWPs, and the like. The other configured information may further include: a waveform parameter used by the donor node of the IAB node or the parent node of the IAB node to configure an available/unavailable resource for the MT of the IAB node, a waveform parameter used by the donor node of the IAB node or the parent node of the IAB node to configure a hard/soft resource for the DU, a maximum or minimum subcarrier spacing, and the like.

Therefore, in some embodiments, the IAB node may determine the guard interval information with reference to a parameter set. The parameter set includes at least one of the following information: a subcarrier spacing or a CP type. For example, the IAB node may determine a quantity of guard symbols based on the time difference between the DU resource and the MT resource and the parameter set. Alternatively, the IAB node may determine a quantity of guard symbols based on the time difference between the DU resource and the MT resource and a switching time.

However, during specific implementation, the IAB node may further report a plurality of sets of guard interval information based on a plurality of parameter sets.

It should be understood that the parameter set herein may be a parameter set of the MT resource, a parameter set of the DU resource, or a common parameter set of the MT resource and the DU resource.

Optionally, the foregoing parameter set is a parameter set of a guard symbol. The guard symbol herein may be neither an MT resource nor a DU resource.

In a specific embodiment, the guard symbol may be defined not based on the DU or the MT, but based on a guard symbol required for switching from DU resources in different directions to MT resources in different directions and a guard symbol required for switching from MT resources in different directions to DU resources in different directions.

For example, a quantity of guard symbols required for switching from MT downlink to DU downlink is defined as e, and a quantity of guard symbols required for switching from DU downlink to MT downlink is defined as f. It can be learned from the foregoing descriptions that, generally, a=d=e and b=c=f. In addition to a guard symbol used when the MT downlink resource is multiplexed with the DU downlink resource, the IAB node may further report a guard symbol used when resources in other directions of the MT are multiplexed with resources in other directions of the DU. For example, the other directions are MT uplink and DU uplink, MT uplink and DU downlink, and MT downlink and DU uplink.

In the foregoing manner, the IAB node may learn of an accurate time difference between the MT resource and the DU resource of the IAB node, and may also have information about the switching time. Therefore, the IAB node can accurately obtain the guard interval information between the MT resource and the DU resource of the IAB node. However, the parent node of the IAB node may not obtain the foregoing information. Therefore, the parent node of the IAB node cannot accurately obtain the guard interval information between the MT resource and the DU resource of the IAB node. To avoid a resource conflict, the IAB node may report the guard interval information between the MT resource and the DU resource of the IAB node to the parent node of the IAB node.

Specifically, the parent node or the donor node of the IAB node may require the IAB node to report guard interval information in various or specific multiplexing cases, or the IAB node may request to report guard symbols in various or specific multiplexing cases to the parent node or the donor node of the IAB node.

In a possible implementation, there may be default guard interval information in various or specific multiplexing cases. When the IAB node does not report the guard interval information, the parent node or the donor node of the IAB node uses the default guard interval information.

In a possible implementation, the default guard interval information is a maximum value that can be obtained for a quantity of guard symbols in various cases. A conflict can be completely avoided by setting the maximum quantity of guard symbols as the default guard interval information.

In a possible implementation, the guard interval information is based on a transmission direction. For example, the guard interval information is used during switching from a downlink first resource to a downlink second resource, for example, switching from MT downlink to DU downlink, or switching from DU downlink to MT downlink. For another example, the guard interval information is used during switching from an uplink first resource to a downlink second resource, for example, switching from MT uplink to DU downlink, or switching from DU uplink to MT downlink. For another example, the guard interval information is used during switching from a downlink first resource to an uplink second resource, for example, switching from MT downlink to DU uplink, or switching from DU downlink to MT uplink. For another example, the guard interval information is used during switching from an uplink first resource to an uplink second resource, for example, switching from MT uplink to DU uplink, or switching from DU uplink to MT uplink.

During specific implementation, the IAB node may report (or determine or receive) guard interval information in all directions or some directions. When the IAB node reports (or determines) guard interval information in some directions, guard interval information in other directions may be derived based on the guard interval information in the some directions. For example, the parent node may consider by default that a quantity of guard symbols during switching from MT downlink to DU downlink of the IAB node is the same as a quantity of guard symbols during switching from DU uplink to MT uplink.

After receiving the reported information from the IAB node, the parent node or the donor node may determine the reported information, indicating that the parent node or the donor node is to use the reported guard symbol information to communicate with the IAB node. In a possible implementation, the parent node or the donor node configures the guard symbol information for the IAB node. For various switching cases, a quantity of configured guard symbols may be greater than or equal to a reported value of the IAB node.

A method for switching from the DU to the MT is the same as a method for switching from the MT to the DU. The following uses switching from the MT to the DU as an example for description. For example, if the IAB node determines guard interval information during switching from MT downlink to DU downlink, the IAB node may determine, based on the guard interval information during switching from MT downlink to DU downlink, guard interval information during switching from MT uplink to DU uplink; and vice versa. For another example, if the IAB node determines guard interval information during switching from MT uplink to DU downlink, the IAB node may determine, based on the guard interval information during switching from MT uplink to DU downlink, guard interval information during switching from MT downlink to DU uplink; and vice versa. For example, if the guard interval information during switching from MT downlink to DU downlink is (a1, b1), the IAB node may determine that the guard interval information during switching from MT uplink to DU uplink is (b1, a1). Reverse derivation is similar to this, and details are not described. If the guard interval information during switching from MT uplink to DU downlink is (c1, d1), the IAB node may determine that the guard interval information during switching from MT downlink to DU uplink is (d1, c1). Reverse derivation is similar to this, and details are not described.

Further, when the guard interval information of the IAB node is different from the default guard interval information, the IAB node requests to report guard interval information in various or specific multiplexing cases.

The foregoing describes the method for determining guard interval information, and the following describes in detail, with reference to the accompanying drawings, the resource multiplexing method provided in the embodiments of this application.

Figure 32:
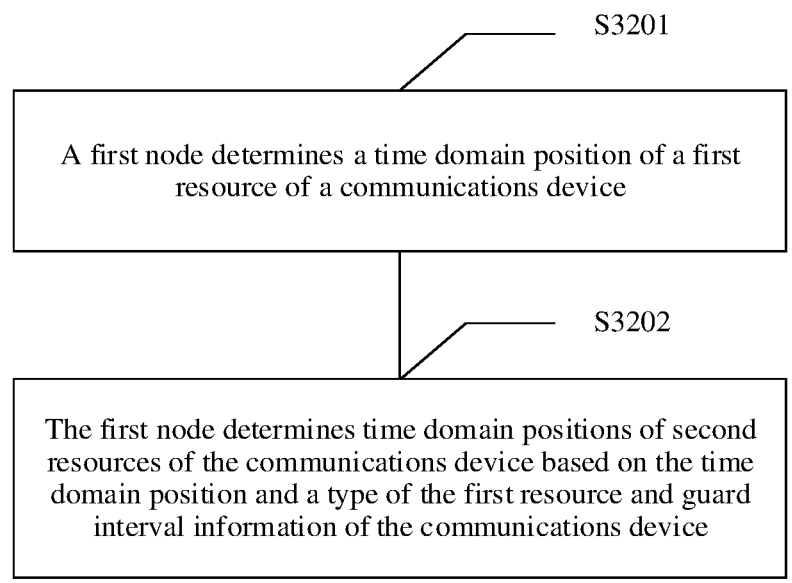
FIG. 32 is a schematic flowchart of a resource multiplexing method according to an embodiment of this application.

FIG. 32 is a flowchart of a resource multiplexing method according to this application. The method includes the following steps.

S3201. A first node determines a time domain position of a first resource of an IAB node.

The first node may be the IAB node. In this case, the first node determines a time domain position of a first resource of the first node. Alternatively, the first node may be a parent node or a donor node of the IAB node. In this case, the first node determines the time domain position of the first resource of the IAB node.

During specific implementation, the IAB node may be a network device, for example, a relay device, or may be an IAB node; or the IAB node may be a terminal device, for example, relay UE; or the IAB node may be another IAB node that needs to perform data backhaul with another IAB node, or the like. This is not specifically limited herein.

In an example description, the time domain position may be a time domain index, for example, a frame number, a slot number, a symbol number, or a combination of the foregoing numbers, for example, a slot number and a symbol number.

S3202. The first node determines time domain positions of second resources of the IAB node based on the time domain position and a type of the first resource and guard interval information of the IAB node. The first resource may be an MT resource, and the second resource may be a DU resource; or the first resource may be a DU resource, and the second resource is an MT resource.

In some embodiments, the first node may determine a time domain position of a first-type second resource of the IAB node based on the time domain position and the type of the first resource and the guard interval information of the IAB node. If the first resource is the DU resource, a first type may be an available type of the MT resource; or if the first resource is the MT resource, a first type may be a hard type of the DU resource.

The "type" herein may be understood as a resource multiplexing based type. If the first resource is the DU resource, the type of the first resource includes hard and soft. If the first resource is the MT resource, the type of the first resource includes available and unavailable.

It should be understood that the "MT resource" is only an example name of a transmission resource for communication between the IAB node and the parent node of the IAB node. In actual application, the transmission resource for communication between the IAB node and the parent node of the IAB node may also have another name, for example, an X resource. If the X resource can be used for communication between the IAB node and the parent node of the IAB node, the X resource may be considered as an MT resource in the embodiments of this application. Similarly, the "DU resource" is only an example name of a transmission resource for communication between the IAB node and a child node of the IAB node. In actual application, the transmission resource for communication between the IAB node and the child node of the IAB node may also have another name, for example, an A resource. If the A resource can be used for communication between the IAB node and the child node of the IAB node, the A resource may be considered as a DU resource in the embodiments of this application.

If the first node is the IAB node, the first node may determine the guard interval information by using the foregoing method for determining guard interval information. If the first node is the parent node of the IAB node or the donor node of the IAB node, the first node receives guard interval information reported by the IAB node.

The guard interval information includes a first symbol quantity N and a second symbol quantity G, the first symbol quantity N is a quantity of guard symbols during switching from the first resource to the second resource, and the second symbol quantity G is a quantity of guard symbols during switching from the second resource to the first resource.

N may be b, d, or f in the foregoing method for determining a guard interval, and G is a, c, or e in the foregoing method for determining a guard interval.

In a possible implementation, if the first resource is the MT resource, and the second resource is the DU resource, N may be equal to d, and G may be equal to c. If the first resource is the DU resource, and the second resource is the MT resource, N may be equal to b, and G may be equal to a.

In another possible implementation, G=a=c=e and N=b=d=f only when a parameter set (a subcarrier spacing and a CP type) used by the first resource and the second resource is consistent with a parameter set reported by the first node. However, when the parameter set used by the first resource and the second resource is inconsistent with the parameter set reported by the first node, G and N need to be obtained through specific conversion by using values such as a and b. For example, assuming that a reported subcarrier spacing is U times (U>1) of a subcarrier spacing used for resource determining, G=ceil(a/U), where ceil( ) represents rounding up. However, when the reported subcarrier spacing is V times (V<1) of the subcarrier spacing used for resource determining, G=a/V.

MT resources may be configured as three types: downlink, uplink, and flexible. The three transmission direction based types are also supported by existing UE, and therefore may be indicated by using existing signaling. DU resources may be classified, based on transmission directions, into four types: uplink, downlink, flexible, and unavailable. Further, DU uplink, downlink, and flexible resources may be further classified into two types: hard and soft. For ease of description, a DU hard-type symbol is referred to as a hard symbol, and a DU soft-type symbol is referred to as a soft symbol below.

In this embodiment of this application, a type of the first resource may be uplink, downlink, or flexible based on a transmission direction, and a type of the second resource may be uplink, downlink, or flexible based on a transmission direction.

Specifically, when the first node determines the time domain positions of the second resources of the IAB node based on the time domain position and the type of the first resource and the guard interval information of the IAB node, specifically, the first node may determine time domain positions of a segment of available second resources located before or after a segment of continuous hard-type first resources of the IAB node based on time domain positions of the segment of first resources.

In this embodiment of this application, the first node may determine a symbol position of an MT resource based on a position of a DU resource whose resource multiplexing based type is hard (that is, a hard symbol (referred to as a DU hard symbol below) in the DU resource); or determine a position of a hard symbol in a DU resource based on a symbol position of an MT resource whose resource multiplexing based type is available.

Specifically, the first node may calculate the last MT available symbol based on the first DU hard symbol in a segment of consecutive DU hard symbols, and calculate the first MT available symbol based on the last DU hard symbol in the segment of consecutive DU hard symbols.

That is, the first node may determine, based on a position of an end symbol of the first resource and N, a position of a start symbol (referred to as a first symbol herein) of a second resource located after the first resource. For example, the first node determines that the start symbol of the second resource located after the first resource is located after the end symbol of the first resource, and there are N symbols between the start symbol of the second resource and the end symbol of the first resource.

The first node may determine, based on a position of a start symbol of the first resource and M, a position of an end symbol (referred to as a third symbol herein) of a second resource located before the first resource. For example, the first node determines that the end symbol of the second resource located before the first resource is located after the start symbol of the first resource, and there are G symbols between the end symbol of the second resource and the start symbol of the first resource.

Alternatively, the first node may determine, based on a position of an end symbol of the first resource, a position of a start symbol of a second resource located after the first resource, and puncture or soften the first resource based on the first symbol quantity N. For example, the first node determines that an index of the position of the start symbol of the second resource located after the first resource and an index of the position of the end symbol of the first resource are consecutive, and punctures or softens the last N symbols of the first resource.

The first node may determine, based on a position of a start symbol of the first resource, a position of an end symbol of a second resource located before the first resource, and puncture or soften the first resource based on the second symbol quantity G. For example, the first node determines that an index of the position of the end symbol of the second resource located before the first resource and an index of the position of the start symbol of the first resource are consecutive, and punctures or softens the first G symbols of the first resource.

The start symbol mentioned in this application is the first symbol, the end symbol is the last symbol, puncturing is to convert a symbol of the first resource into an N/A symbol, and softening is to convert a symbol of the first resource into a soft symbol.

The first node may obtain a time domain position or an index of a DU hard symbol of the IAB node by using the following method: The donor node of the IAB node configures a hard/soft resource type of a DU for the IAB node. Alternatively, a special signal or channel of the DU of the IAB node is used to send or receive a resource, and the resource is converted into a DU hard resource. The special signal or channel may include but is not limited to a synchronization signal block (SSB), a random access channel (RACH), a periodic channel state information reference signal (CSI-RS), a broadcast channel for sending system information block 1 (SIB 1), and the like. In a possible implementation, the special signal may be a cell-level signal or channel of the DU.

To better understand the resource multiplexing method provided in this embodiment of this application, the following provides detailed descriptions with reference to specific scenarios.

Scenario 1: The first resource is the DU resource, and the second resource is the MT resource, that is, a DU hard/soft resource of the IAB node is explicitly configured. Both the IAB node and the parent node or the donor node of the IAB node can learn of a position of a DU hard symbol of the IAB node, and derive a position of an available symbol of the MT resource based on the position.

In Scenario 1, N is equal to b in the foregoing method for determining guard interval information, and G is equal to a in the foregoing method for determining guard interval information.

Method 1: The first node determines a start position and an end position of MT available symbols based on a boundary symbol of the DU hard resource and the guard interval information.

Figure 33:
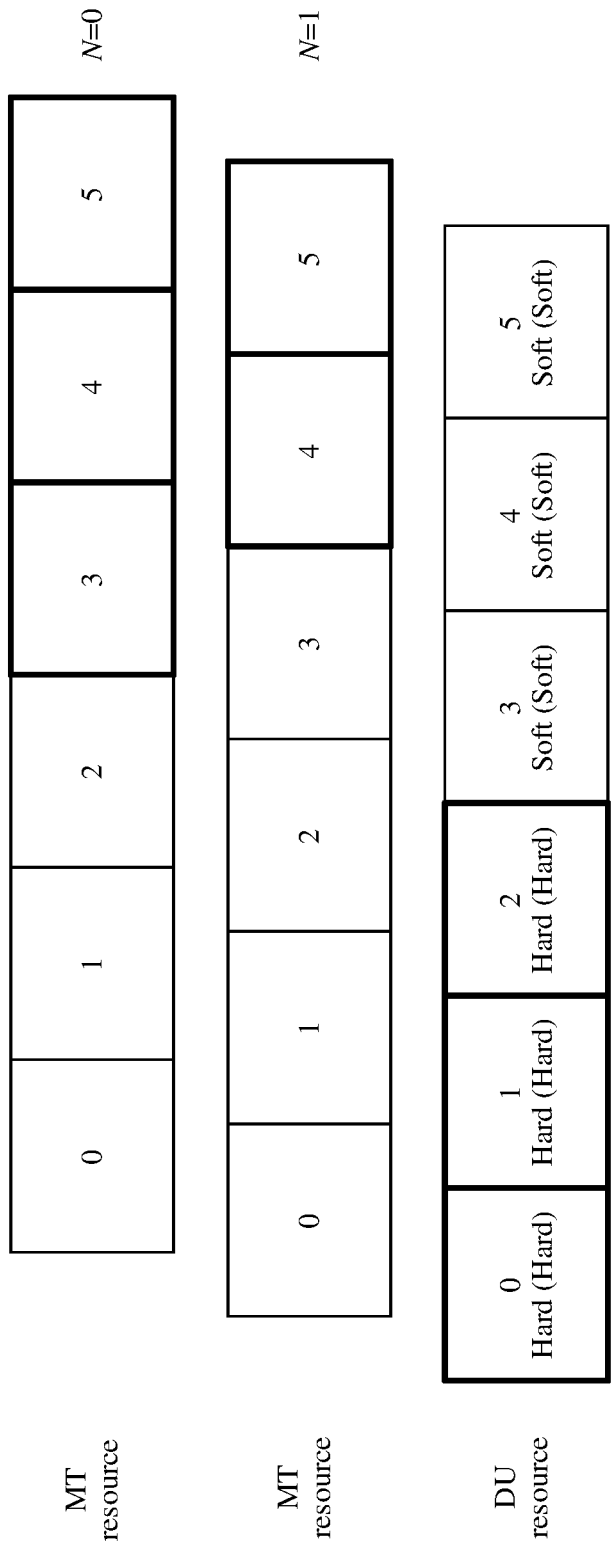
FIG. 33 is a schematic diagram of resource multiplexing according to an embodiment of this application.

For a segment of consecutive DU hard symbols, the first MT available symbol (that is, the start position of the MT available symbols) after the last symbol in the segment of consecutive DU hard symbols may be determined based on the last symbol. It is assumed that the last DU hard symbol is a symbol 2, and different start positions of the MT available symbols may be obtained based on different values of N. For example, when N is equal to 0, the start position of the MT available symbols is a symbol 3; or when N is equal to 1, the start position of the MT available symbols is a symbol 4, as shown in FIG. 33.

Figure 34:
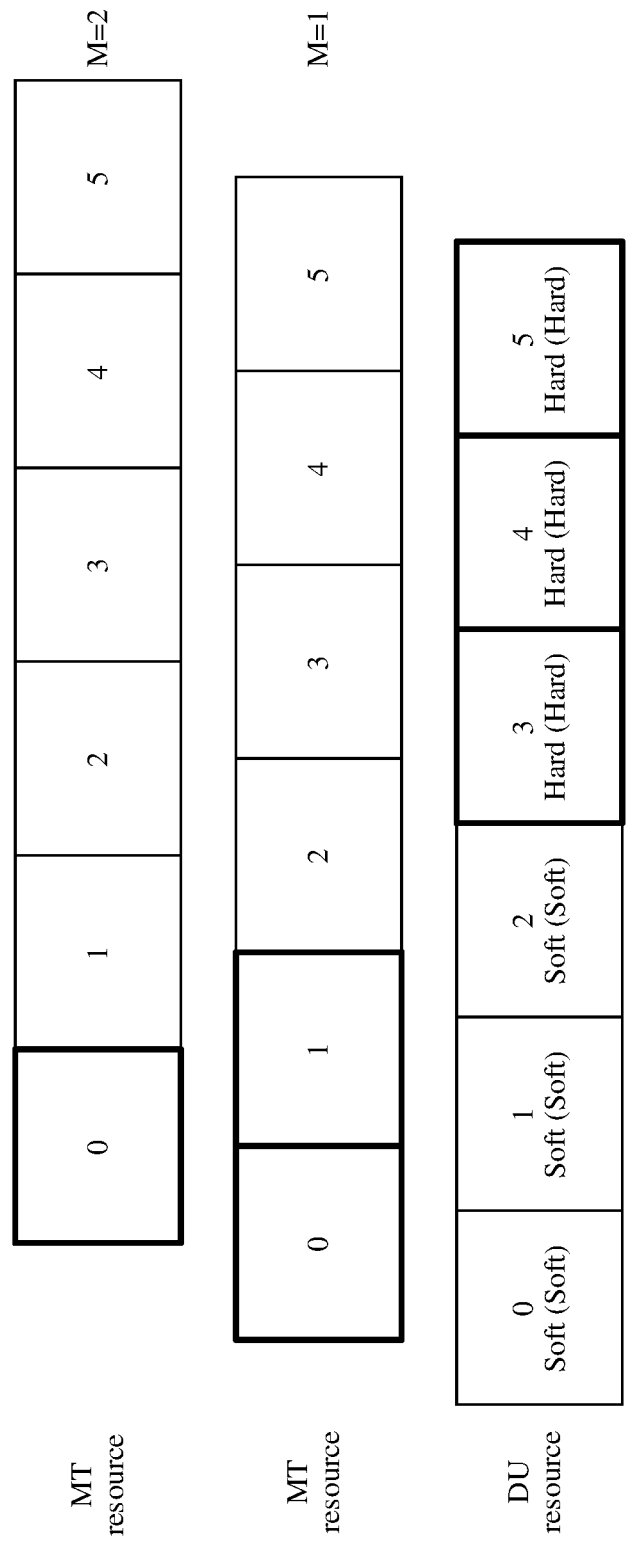
FIG. 34 is a schematic diagram of resource multiplexing according to an embodiment of this application.

For a segment of consecutive DU hard symbols, the last MT available symbol (that is, the end position of the MT available symbols) before the first symbol in the segment of consecutive DU hard symbols is determined based on the first symbol. It is assumed that the first DU hard symbol is a symbol 3, and different end positions of the MT available symbols may be obtained based on different values of G. For example, when G is equal to 1, the end position of the MT available symbols is a symbol 1; or when G is equal to 2, the end position of the MT available symbols is a symbol 0, as shown in FIG. 34.

Method 2: The first node determines a start position and an end position of MT available symbols based on a boundary symbol of the DU hard resource, and punctures or softens the DU hard resource based on the guard interval information. Puncturing the DU hard resource is to convert the DU hard symbol into an N/A symbol, and softening the DU hard resource is to convert the DU hard symbol into a soft symbol. It should be understood that, according to Method 2, a configured DU hard symbol of the IAB node may be different from an actual hard symbol.

For a segment of consecutive DU hard symbols, the first MT available symbol (that is, the start position of the MT available symbols) after the last symbol in the segment of consecutive DU hard symbols is determined based on the last symbol, where an index of the start position of the MT available symbols and an index of the last hard symbol are consecutive. Then, N hard symbols at a tail are converted into soft symbols or N/A symbols based on the index of the MT symbol and N. It is assumed that the last DU hard symbol is a symbol 2. Herein, an MT symbol 3 may be determined as the first available symbol, and the last N DU hard symbols are converted into soft symbols or N/A symbols. For example, if N is equal to 1, the last DU hard symbol (namely, the symbol 2) may be converted into a soft symbol or an N/A symbol. For another example, if N is equal to 2, the last two DU hard symbols (namely, a symbol 1 and the symbol 2) may be converted into soft symbols or N/A symbols, as shown in FIG. 35.

For a segment of consecutive DU hard symbols, the last MT available symbol (that is, the end position of the MT available symbols) after the first symbol in the segment of consecutive DU hard symbols is determined based on the first symbol, where an index of the end position of the MT available symbols and an index of the first hard symbol are consecutive. Then, G hard symbols at a head are converted into soft symbols or N/A symbols based on the index of the MT symbol and G. It is assumed that the first DU hard symbol is a symbol 3. Herein, an MT symbol 2 may be determined as the last available symbol, and the first G DU hard symbols are converted into soft symbols or N/A symbols. For example, if G is equal to 1, the first DU hard symbol (namely, the symbol 3) may be converted into a soft symbol or an N/A symbol. For another example, if G is equal to 2, the first two DU hard symbols (namely, the symbol 3 and a symbol 4) may be converted into soft symbols or N/A symbols, as shown in FIG. 36.

Before Method 1 and Method 2 are performed, the IAB node may further perform an initial resource type determining process: determining an MT symbol having a same index as a DU hard symbol as an unavailable symbol, or determining an MT symbol having a same index as a DU soft symbol and a null symbol as an available symbol. Then, on a boundary of an MT available symbol or a boundary of a hard symbol, the IAB node punctures the MT available symbol or punctures or softens the DU hard resource according to Method 1 or Method 2.

In the descriptions of Scenario 1, determining of the boundary of the MT symbol based on the boundary of the DU hard symbol is described. In a possible implementation, the parent node of the IAB node may directly indicate, by using dynamic signaling (for example, downlink control information (downlink control information, DCI)), some DU soft symbols as available. In this case, the first node may determine the boundary of the MT available symbol based on the soft symbol that is indicated as available. A determining method is the same as a method for determining the MT available symbol based on the boundary of the hard symbol, that is, the hard symbol may be directly replaced with the soft symbol that is indicated as available. The soft symbol that is indicated as available is available to the DU.

Scenario 2: The first resource is the MT resource, and the second resource is the DU resource. An MT available resource of the IAB node is directly configured by the parent node/donor node of the IAB node by using RRC signaling. After obtaining the MT available resource, the first node may determine a DU hard resource based on the MT resource.

In Scenario 2, N is equal to d in the foregoing method for determining a guard interval, and G is equal to c in the foregoing method for determining a guard interval.

Method 3: The first node determines the last DU hard symbol before the first symbol in a segment of consecutive MT available symbols based on the first symbol and G, and determines the first DU hard symbol after the last symbol in the segment of consecutive MT available symbols based on the last symbol and N.

Figure 37:
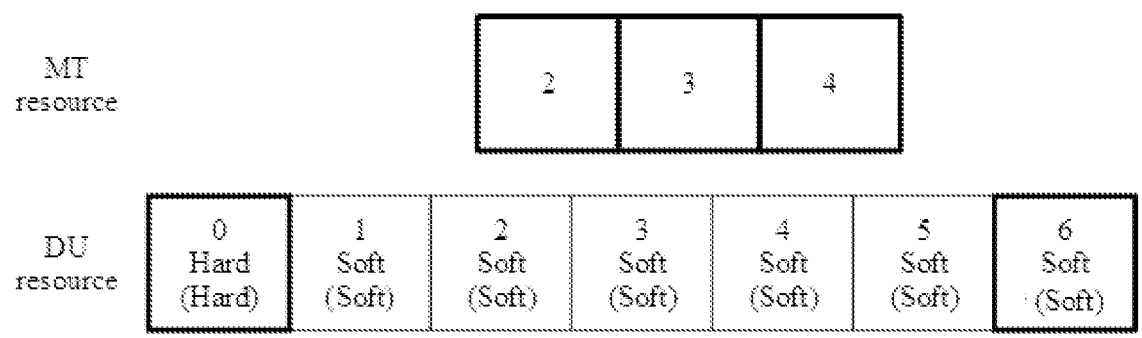
FIG. 37 is a schematic diagram of resource multiplexing according to an embodiment of this application.

In Method 3, a resource configured as an MT available symbol is always considered as available, and a DU hard resource is adjusted based on a position of the MT available symbol. For example, it is assumed that MT symbols {2, 3, 4} are configured as available symbols, and an end position and a start position of hard symbols are determined based on G and N. If N is equal to 1 and G is equal to 1, the last symbol of a DU hard resource before an MT resource is a symbol 0, and the first symbol of a DU hard resource after the MT resource is a symbol 6, as shown in FIG. 37.

Method 4: The first node punctures the MT resource based on the guard interval information, and determines a start position and an end position of the DU hard resource based on a boundary symbol of the MT resource. Puncturing the MT resource is to convert an MT available symbol into an N/A symbol. It should be understood that, according to Method 4, a configured MT available symbol of the IAB node may be different from an actual available symbol.

Figure 38:
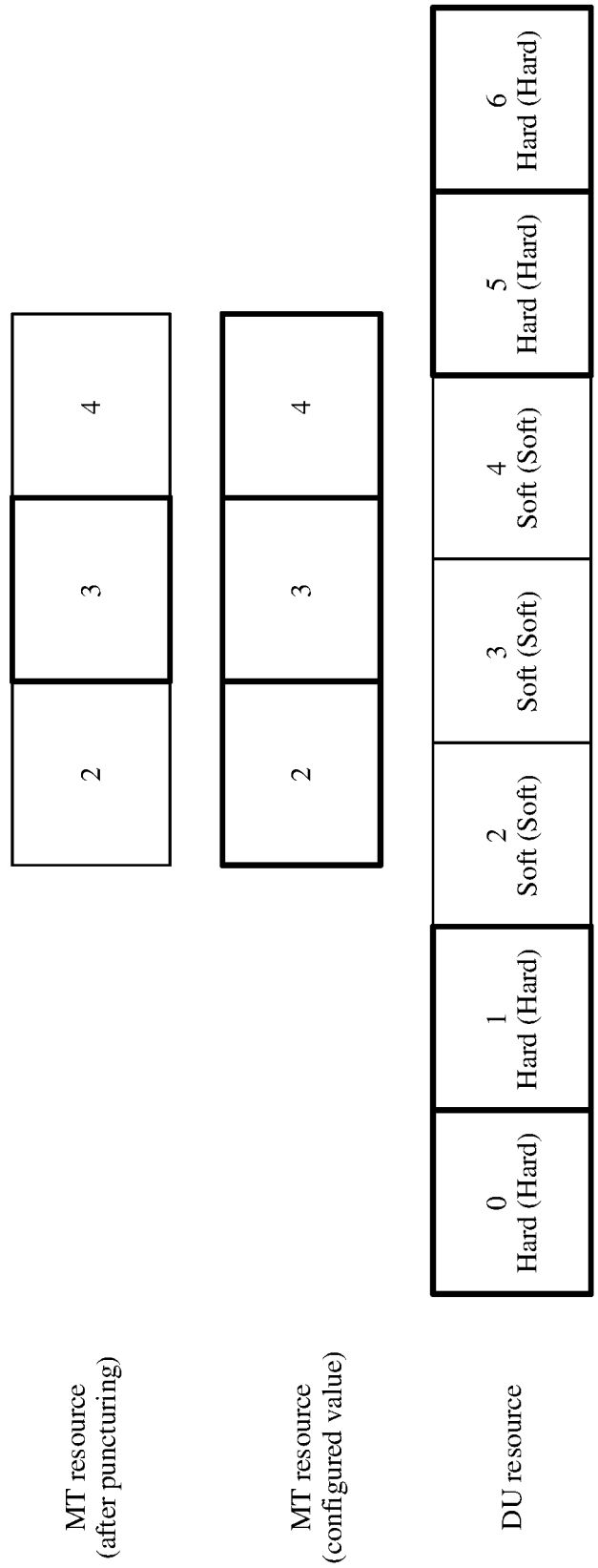
FIG. 38 is a schematic diagram of resource multiplexing according to an embodiment of this application.

In Method 4, a DU symbol before the MT symbol and a DU symbol after the MT symbol are considered as hard, and then the first node may convert some available symbols into unavailable symbols based on the guard interval information. This method is referred to as puncturing the MT symbol herein. For example, it is assumed that MT symbols {2, 3, 4} are configured as available symbols, an end position and a start position of hard symbols are determined based on the MT available symbols, and then it is determined, based on G and N, to puncture the MT available symbols. If N is equal to 1 and G is equal to 1, the first symbol (namely, the symbol 2) and the last symbol (namely, the symbol 4) of the MT resource are punctured, as shown in FIG. 38.

Before Method 3 and Method 4 are performed, the IAB node may further perform an initial resource type determining process: determining a DU symbol having a same index as an MT available symbol as a DU soft symbol, or determining a DU symbol having a same index as an MT unavailable symbol as a DU hard symbol. Then, on a boundary of an MT available symbol or a boundary of a hard symbol, the IAB node punctures the MT available resource or softens the DU hard resource according to Method 3 or Method 4.

In the foregoing two scenarios, four methods for determining the MT resource based on the DU resource and determining the DU resource based on the MT resource are separately provided. During specific implementation, the first node may use one method based on a specific scenario, or the first node may use a combination of a plurality of methods. It should be understood that selection or a combination of the plurality of methods may be specified in a protocol, or may be configured by the donor node or the parent node, or may be requested or reported by the IAB node. The following provides example descriptions of a combination of several methods.

Optionally, a type of a DU unavailable resource can be modified in none of the foregoing methods, that is, the IAB node cannot use a DU resource configured as unavailable to communicate with a child node or child UE.

In the first example description, if a resource is configured for an MT, the first node may determine the DU hard resource by using the foregoing Method 3 or Method 4. However, if the DU resource of the IAB node includes some hard symbols converted from a special signal such as an SSB, the first node may further determine, by using the foregoing Method 1, an MT available/unavailable resource based on the hard resources converted from the special signal.

In the second example description, when a DU configuration is derived by using an MT configuration, for an MT downlink start symbol, the first node may determine a position of the last DU hard symbol before the MT resource by using the foregoing Method 3; and for an MT downlink end symbol, the first node may determine a position of the first DU hard symbol after the MT resource by using the foregoing Method 4, and puncture the tail of the MT resource. For an MT uplink start symbol, the first node may determine a position of the last DU hard symbol before the MT resource by using the foregoing Method 4, and puncture a start symbol of the MT resource; and for an MT uplink end symbol, the first node may determine a position of the first DU hard symbol after the MT resource by using the foregoing Method 3.

In the third example description, when an MT available symbol is derived by using a DU configuration, for a start symbol of consecutive DU downlink hard symbols, the first node may derive an end position of MT available symbols before the DU hard resource by using the foregoing Method 1; and for an end symbol of the consecutive DU downlink hard symbols, the first node may derive an MT start available symbol by using the foregoing Method 2, and soften a tail symbol of the DU downlink hard resource. For a start symbol of consecutive DU uplink hard symbols, the first node may derive an end position of MT available symbols before the DU hard resource by using the foregoing Method 2, and soften a head symbol of the DU uplink hard resource; and for an end symbol of the consecutive DU uplink hard symbols, the first node may derive a start position of the MT available symbols by using the foregoing Method 1. However, if the DU resource of the IAB node includes some hard symbols converted from a special signal such as an SSB, the first node may further determine, by using the foregoing Method 1, an MT available/unavailable resource based on the hard resources converted from the special signal. In the fourth example description, when a DU configuration is derived by using an MT configuration, if a resource is indicated based on a slot granularity, that is, a start symbol or an end symbol of an MT resource (for example, an MT available resource) is a start symbol or an end symbol of a slot, the method described in the foregoing second example description may be used. If a resource is indicated based on a symbol granularity, the foregoing Method 3 is used, that is, an MT available symbol is always preferably used. In other words, when a configured moment for switching between the DU resource and the MT resource is a slot boundary, the method described in the foregoing second example description is used. When a configured moment for switching between the DU resource and the MT resource is inside a slot, the method described in the descriptions of the foregoing Method 3 is used.

In the fifth example description, when an MT configuration is derived by using a DU configuration, if a resource is indicated based on a slot granularity, that is, a start symbol or an end symbol of a DU resource (for example, a DU hard resource) is a start symbol or an end symbol of a slot, the method described in the foregoing third example description is used. If a resource is indicated based on a symbol granularity, the foregoing Method 1 is used, that is, a DU hard symbol is always preferably used. In other words, when a configured moment for switching between the DU resource and the MT resource is a slot boundary, the method described in the foregoing third example description is used. When a configured moment for switching between the DU resource and the MT resource is inside a slot, the method described in the descriptions of the foregoing Method 1 is used. However, if the DU resource of the IAB node includes some hard symbols converted from a special signal such as an SSB, the first node may further determine, by using the foregoing Method 1, an MT available/unavailable resource based on the hard resources converted from the special signal.

In the sixth example description, a DU hard symbol that cannot be softened or punctured may be defined in a protocol. The hard symbol that cannot be softened or punctured means that regardless of a configuration of an MT resource, the DU hard symbol is not converted into a soft symbol or is converted into an unavailable symbol. The hard symbol that cannot be softened or punctured includes one or more of the following symbols: a DU hard symbol configured with a special signal or channel such as an SSB, the first Y (where Y is an integer such as 1, 2, or 3) symbols of a DU downlink slot, or the last W (where W is an integer such as 1 or 2) symbols of a DU uplink slot. It should be understood that in some special cases, for example, when the MT receives an SSB, the MT of the IAB node may still occupy a DU symbol that cannot be softened or punctured. Optionally, the DU hard symbol that cannot be softened or punctured may alternatively be configured by the donor node or the parent node, or may be reported by the IAB node.

In the seventh example description, an MT available symbol that cannot be punctured may be defined in a protocol. The available symbol that cannot be punctured means that regardless of a configuration of a DU resource, the MT available symbol is not converted into an unavailable symbol. The MT symbol that cannot be punctured includes one or more of the following symbols: the first X (where X is an integer such as 1, 2, or 3) symbols of an MT downlink slot, the last Z (where Z is an integer such as 1 or 2) symbols of an MT uplink slot, an MT symbol configured with a specific PDCCH monitoring, or the like. Herein, the specific PDCCH includes a PDCCH used to transmit DCI dynamically indicating the MT resource and the DU resource. Optionally, the MT available symbol that cannot be punctured may alternatively be configured by the donor node or the parent node, or may be reported by the IAB node.

For the DU hard symbol that cannot be softened or punctured and the MT symbol that cannot be punctured, priorities may be additionally defined for the two symbols, or it may be specified in a protocol that the two symbols cannot conflict with each other.

Optionally, priorities of some DU resources and MT resources may be configured by the donor node or the parent node, or reported by the IAB node. In a possible implementation, the some DU resources and MT resources do not include the DU hard symbol that cannot be softened or punctured and the MT symbol that cannot be punctured. In a possible implementation, if resource switching is performed based on a slot granularity, that is, a configured moment for switching between the DU resource and the MT resource is a slot boundary, the parent node or the IAB node may ignore a negative quantity of guard symbols when deriving a resource type, that is, the parent node or the IAB node may consider the negative quantity of guard symbols as 0. If a configured moment for switching between the DU resource and the MT resource is inside a slot, the parent node or the IAB node needs to consider a negative quantity of guard symbols when deriving a resource type.

The IAB node does not expect a resource that is of the IAB node and that is scheduled by the parent node to receive or send a PDSCH or a PUSCH to include an MT unavailable symbol. Optionally, if a time-domain mapping position that is of the PDSCH or the PUSCH and that is indicated by scheduling DCI includes an MT unavailable symbol, the IAB node considers that the PDSCH or the PUSCH is not mapped to the unavailable symbol.

The IAB node does not expect a resource that is of the IAB node, that is used to send a PUCCH, and that is indicated by the parent node by using dynamic signaling to include an MT unavailable symbol. An information indication carried on the PUCCH herein includes HARQ-ACK information fed back by the MT of the IAB node.

When a resource that is occupied by a signal configured by using higher layer signaling and that is of the MT of the IAB node includes an MT unavailable symbol, the MT of the IAB node may abandon sending or receiving of the signal. Herein, the signal configured by using the higher layer signaling includes a periodic CSI-RS, a semi-static CSI-RS, an SRS, PDCCH monitoring, or the like. It should be understood that, only several possible combination manners are described in the embodiments of this application, but no specific limitation is constituted. During specific implementation, other combination manners may also be used, and are not listed one by one herein.

Figure 39:
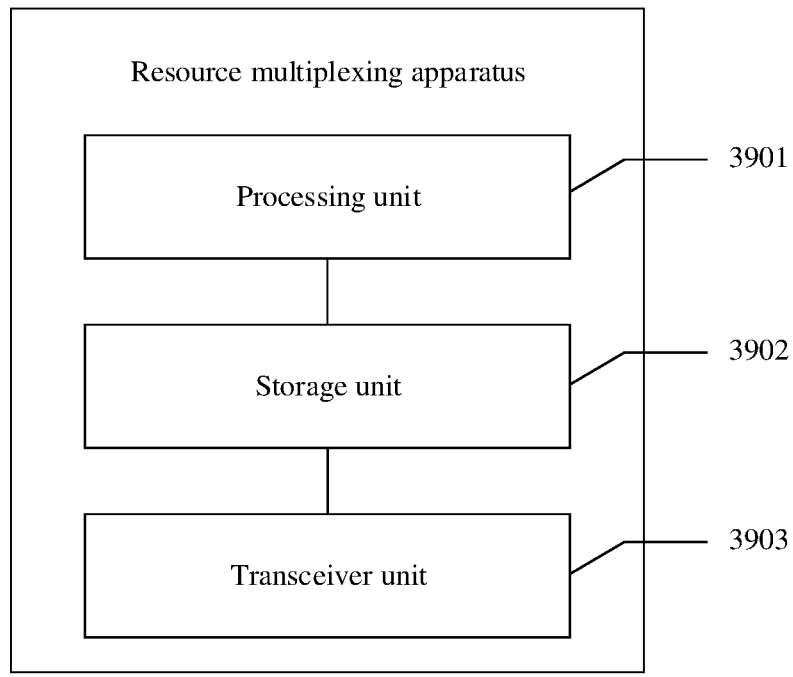
FIG. 39 is a schematic diagram of guard symbols before and after an MT symbol according to an embodiment of this application.

Based on a same technical concept as the method embodiments, an embodiment of this application provides a resource multiplexing apparatus. The resource multiplexing apparatus may be specifically configured to implement the method performed by the IAB node in the embodiments in FIG. 7 to FIG. 38. The apparatus may be a first node, or may be a chip or a chip set in a first node, or a part of a chip configured to perform a related method function. The first node may be an IAB node, or may be a parent node or a donor node of the IAB node. A structure of the apparatus may be shown in FIG. 39, and the apparatus includes a processing unit 3901 and a storage unit 3902. The storage unit 3902 is configured to store a code instruction. The processing unit 3901 is configured to invoke the code instruction stored in the storage unit 3902 to perform the following operations: determining a time domain position of a first resource of a communications device; and determining time domain positions of second resources of the communications device based on the time domain position and a type of the first resource and guard interval information, where the guard interval information includes a first symbol quantity and a second symbol quantity, the first symbol quantity is a quantity of guard symbols during switching from the first resource to the second resource, and the second symbol quantity is a quantity of guard symbols during switching from the second resource to the first resource; and the first resource is a mobile terminal MT resource, and the second resource is a distributed unit DU resource; or the first resource is a DU resource, and the second resource is an MT resource.

A type of the DU resource may include hard hard and soft soft; and a type of the MT resource may include available and unavailable.

In an implementation, when determining the time domain positions of the second resources of the communications device based on the time domain position of the first resource and the guard interval information, the processing unit 3901 may be specifically configured to: determine, based on a position of an end symbol of the first resource and the first symbol quantity, a position of a start symbol of a second resource located after the first resource; and determine, based on a position of a start symbol of the first resource and the second symbol quantity, a position of an end symbol of a second resource located before the first resource.

Specifically, when determining, based on the position of the end symbol of the first resource and the first symbol quantity, the position of the start symbol of the second resource located after the first resource, the processing unit 3901 may be specifically configured to determine that the start symbol of the second resource located after the first resource is located after the end symbol of the first resource, and there are N symbols between the start symbol of the second resource and the end symbol of the first resource, where N is the first symbol quantity.

When determining, based on the position of the start symbol of the first resource and the second symbol quantity, the position of the end symbol of the second resource located before the first resource, the processing unit 3901 may be specifically configured to determine that the end symbol of the second resource located before the first resource is located after the start symbol of the first resource, and there are M symbols between the end symbol of the second resource and the start symbol of the first resource, where M is the second symbol quantity.

In another implementation, when determining the time domain positions of the second resources of the communications device based on the time domain position of the first resource and the guard interval information, the processing unit 3901 may be specifically configured to: determine, based on a position of an end symbol of the first resource, a position of a start symbol of a second resource located after the first resource; and determine, based on a position of a start symbol of the first resource, a position of an end symbol of a second resource located before the first resource. After the first node determines the time domain positions of the second resources of the communications device based on the time domain position of the first resource and the guard interval information, the processing unit 3901 may be further configured to: puncture or soften the first resource based on the first symbol quantity, or puncture or soften the first resource based on the second symbol quantity.

Specifically, when determining, based on the position of the end symbol of the first resource, the position of the start symbol of the second resource located after the first resource, and puncturing or softening the first resource based on the first symbol quantity, the processing unit 3901 may be specifically configured to: determine that an index of the position of the start symbol of the second resource located after the first resource and an index of the position of the end symbol of the first resource are consecutive, and puncture or soften the last N symbols of the first resource, where N is the first symbol quantity.

When determining, based on the position of the start symbol of the first resource, the position of the end symbol of the second resource located before the first resource, and puncturing or softening the first resource based on the second symbol quantity, the processing unit 3901 may be specifically configured to: determine that an index of the position of the end symbol of the second resource located before the first resource and an index of the position of the start symbol of the first resource are consecutive, and puncture or soften the first M symbols of the first resource, where M is the second symbol quantity.

In some embodiments, the first resource is the DU resource, and after determining the time domain positions of the second resources of the communications device based on the time domain position of the first resource and the guard interval information, the processing unit may be further configured to: determine that at least one DU symbol of the soft type is indicated as available; and redetermine a time domain position of the second resource based on a position of the DU symbol indicated as available, the time domain position of the first resource, the first symbol quantity, and the second symbol quantity.

In an implementation, if the first node is the parent node or the donor node of the communications device, the apparatus may further include a transceiver unit 3903, configured to receive the guard interval information reported by the communications device.

In another implementation, if the first node is the communications device, the processing unit 3901 may be further configured to determine the guard interval information. Further, the apparatus may further include a transceiver unit 3903, configured to: after the processing unit determines the guard interval information, report the guard interval information to a second node, where the second node is a parent node or a donor node of the communications device.

In a possible implementation, when determining the guard interval information, the processing unit 3901 may be specifically configured to determine the guard interval information based on a time difference between the first resource and the second resource; or determine the guard interval information based on a time difference between the first resource and the second resource and a switching time, where the switching time is a time required by the communications device to perform switching between receiving and sending.

Specifically, when determining the guard interval information based on the time difference between the first resource and the second resource, the processing unit 3901 may be specifically configured to determine the first symbol quantity and the second symbol quantity based on the time difference between the first resource and the second resource and a parameter set, where the parameter set is at least one of the following information: subcarrier spacings of the first resource and the second resource, and cyclic prefix CP types of the first resource and the second resource.

When determining the guard interval information based on the time difference between the first resource and the second resource and the switching time, the processing unit 3901 may be specifically configured to determine the first symbol quantity and the second symbol quantity based on the time difference between the first resource and the second resource, the switching time, and a parameter set, where the parameter set is at least one of the following information: subcarrier spacings of the first resource and the second resource, and CP types of the first resource and the second resource.

For example, the type of the first resource may be uplink, downlink, or flexible, and a type of the second resource may be uplink, downlink, or flexible.

Division into modules in the embodiments of this application is an example, is merely logical function division, and may be other division during actual implementation. In addition, functional modules in the embodiments of this application may be integrated into one processor, or each of the modules may exist alone physically, or two or more modules may be integrated into one module. The integrated module may be implemented in a form of hardware, or may be implemented in a form of a software functional module. It may be understood that, for functions or implementations of the modules in the embodiments of this application, further refer to related descriptions in the method embodiments.

Figure 40:
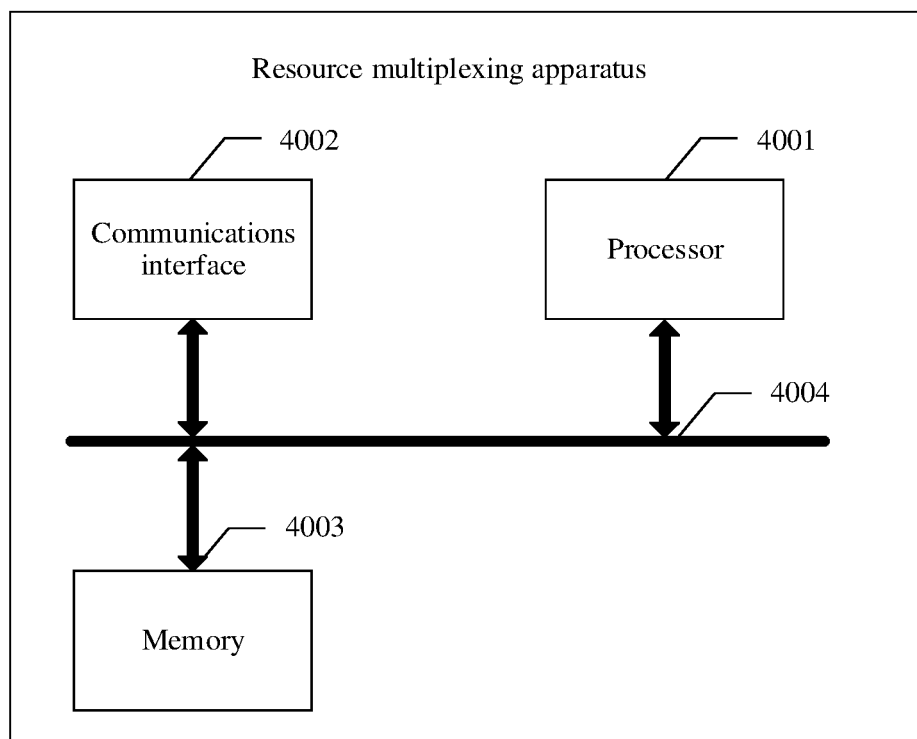
FIG. 40 is a schematic diagram of guard symbols before and after an MT symbol according to an embodiment of this application.

In a possible manner, a resource multiplexing apparatus may be shown in FIG. 40. The apparatus may be a first node or a chip in a first node. The first node may be a communications device, or may be a parent node or a donor node of a communications device. The apparatus may include a processor 4001, a communications interface 4002, and a memory 4003. The processing unit 3901 may be the processor 4001. The transceiver unit 3903 may be the communications interface 4002.

The processor 4001 may be a central processing unit (CPU), a digital processing unit, or the like. The communications interface 4002 may be a transceiver, an interface circuit such as a transceiver circuit, a transceiver chip, or the like. The apparatus further includes the memory 4003, configured to store a program to be executed by the processor 4001. The memory 4003 may be a nonvolatile memory, for example, a hard disk drive (HDD) or a solid-state drive (sSSD), or may be a volatile memory, for example, a random access memory (RAM). The memory 4003 is any other medium that can be used to carry or store expected program code in a form of an instruction or a data structure and that can be accessed by a computer, but is not limited thereto.

The processor 4001 is configured to execute the program code stored in the 4003, and is specifically configured to perform an action of the processing unit 3901. Details are not described in this application again. The communications interface 4002 is specifically configured to perform an action of the transceiver unit 3903. Details are not described in this application again. The memory 4003 is specifically configured to perform an action of the storage unit 3902. Details are not described in this application again.

In this embodiment of this application, a specific connection medium between the communications interface 4002, the processor 4001, and the memory 4003 is not limited. In this embodiment of this application, the memory 4003, the processor 4001, and the communications interface 4002 are connected by using a bus 4004 in FIG. 40. The bus is represented by a thick line in FIG. 40. A connection manner between other components is schematically described, and is not limited thereto. The bus may be classified into an address bus, a data bus, a control bus, and the like. For ease of representation, only one thick line is used to represent the bus in FIG. 40, but this does not mean that there is only one bus or only one type of bus.

An embodiment of the present invention further provides a computer-readable storage medium, configured to store a computer software instruction that needs to be executed by the foregoing processor. The computer software instruction includes a program that needs to be executed by the foregoing processor.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or the functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium (for example, an SSD).

This application is described with reference to the flowcharts and/or the block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided to a processor of a general-purpose computer, a dedicated computer, an embedded processor, or another programmable data processing device to generate a machine, so that the instructions executed by a processor of a computer or another programmable data processing device generate an apparatus configured to implement a specified function in one or more processes in the flowcharts and/or in one or more blocks in the block diagrams.

These computer program instructions may be stored in a computer-readable memory that can instruct the computer or another data processing device to work in a specific manner, so that the instructions stored in the computer-readable memory generate an artifact that includes an instruction apparatus. The instruction apparatus implements a specified function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

It is clear that a person skilled in the art can make various modifications and variations to this application without departing from the spirit and scope of this application. In this way, this application is intended to cover these modifications and variations of this application provided that they fall within the scope of the claims of this application and equivalent technologies thereof.

What is claimed is:

1. A method, comprising:
receiving, by a second node, first configuration information sent by a first node, wherein:
the first configuration information indicates first guard interval information;
the first guard interval information comprises a first symbol quantity and a second symbol quantity, the first symbol quantity being a quantity of guard symbols during switching from a first resource to a second resource, the second symbol quantity being a quantity of guard symbols during switching from the second resource to the first resource;
the first resource is a distributed unit (DU) resource and the second resource is a mobile terminal (MT) resource; and
the first node is a parent node or a donor node of the second node; and
determining, by the second node, a time domain position of the second resource based on a time domain position of the first resource and the first guard interval information.

2. The method according to claim 1, wherein:
the first symbol quantity comprises a quantity of guard symbols during switching from a DU uplink symbol to an MT uplink symbol, a quantity of guard symbols during switching from a DU uplink symbol to an MT downlink symbol, a quantity of guard symbols during switching from a DU downlink symbol to an MT uplink symbol, and a quantity of guard symbols during switching from a DU downlink symbol to an MT downlink symbol; and
the second symbol quantity comprises a quantity of guard symbols during switching from an MT downlink symbol to a DU downlink symbol, a quantity of guard symbols during switching from an MT downlink symbol to a DU uplink symbol, a quantity of guard symbols during switching from an MT uplink symbol to a DU downlink symbol, and a quantity of guard symbols during switching from an MT uplink symbol to a DU uplink symbol.

3. The method according to claim 1, wherein the first configuration information further indicates a subcarrier spacing of the first symbol quantity and a subcarrier spacing of the second symbol quantity.

4. The method according to claim 1, further comprising reporting, by the second node, second guard interval information to the first node, wherein the second guard interval information comprises a third symbol quantity and a fourth symbol quantity, the third symbol quantity being a quantity of guard symbols during switching from the first resource to the second resource, and the fourth symbol quantity being a reported quantity of guard symbols during switching from the second resource to the first resource, wherein:

the third symbol quantity comprises a quantity of guard symbols during switching from a DU uplink symbol to an MT uplink symbol, a quantity of guard symbols during switching from a DU uplink symbol to an MT downlink symbol, a quantity of guard symbols during switching from a DU uplink symbol to an MT downlink symbol, and a quantity of guard symbols during switching from a DU downlink symbol to an MT downlink symbol; and the fourth symbol quantity comprises a quantity of guard symbols during switching from an MT downlink symbol to a DU downlink symbol, a quantity of guard symbols during switching from an MT downlink symbol to a DU uplink symbol, a quantity of guard symbols during switching from an MT uplink symbol to a DU downlink symbol, and a quantity of guard symbols during switching from an MT uplink symbol to a DU uplink symbol.

5. The method according to claim 4, wherein there are one or more sets of second guard interval information, and each set of second guard interval information of the one or more sets of second guard interval information corresponds to one subcarrier spacing of one or more subcarrier spacings.

6. The method according to claim 4, wherein a value of the third symbol quantity is any one of: 0, 1, 2, or 3.

7. The method according to claim 4, wherein a value of the fourth symbol quantity is any one of: 0, 1, 2, or 3.

8. The method according to claim 1, wherein a value of the first symbol quantity is any one of: 0, 1, 2, or 3.

9. The method according to claim 1, wherein a value of the second symbol quantity is any one of: 0, 1, 2, or 3.

10. The method according to claim 1, further comprising:
determining, by the second node, that a start symbol of the second resource is located after an end symbol of the first resource, and that there are N symbols between the end symbol of the first resource and the start symbol of the second resource, wherein N is the first symbol quantity; or
determining, by the second node, that an end symbol of the second resource is located before a start symbol of the first resource, and that there are M symbols between the end symbol of the second resource and the start symbol of the first resource, wherein M is the second symbol quantity.

11. The method according to claim 10, wherein a position of the end symbol of the first resource comprises one or more of:
a symbol boundary of a symbol of a hard type that is in the first resource,
a symbol boundary of a symbol of a soft type that is in the first resource and indicated as available, or
a symbol boundary of a symbol that is in the first resource and that is converted into a hard type by a special signal or channel.

12. The method according to claim 11, wherein:
the position of the end symbol of the first resource comprises the symbol boundary of the symbol that is in the first resource and that is converted into the hard type by the special signal or channel; and
the special signal or channel comprises any one or more of:
a synchronization signal block (SSB),
a random access channel (RACH),
a periodic channel state information reference signal (CSI-RS),
a broadcast channel for sending a system information block type 1 (SIB 1), or
a cell-level signal or channel.

13. The method according to claim 10, wherein a position of the start symbol of the first resource comprises one or more of:
a symbol boundary of a symbol of a hard type that is in the first resource,
a symbol boundary of a symbol of a soft type that is in the first resource and indicated as available, or
a symbol boundary of a symbol that is in the first resource and that is converted into a hard type by a special signal or channel.

14. A non-transitory computer-readable storage medium storing a computer program or an instruction that, when read and executed by one or more processors, cause the one or more processors to perform operations comprising the method according to claim 1.

15. A method, comprising:
sending, by a first node, first configuration information to a second node, wherein:
the first configuration information indicates first guard interval information;
the first guard interval information comprises a first symbol quantity and a second symbol quantity, the first symbol quantity being a quantity of guard symbols during switching from a first resource to a second resource, the second symbol quantity being a quantity of guard symbols during switching from the second resource to the first resource;
the first resource is a distributed unit (DU) resource, and the second resource is a mobile terminal (MT) resource; and
the first node is a parent node or a donor node of the second node; and
determining, by the second node, a time domain position of the second resource based on a time domain position of the first resource and the first guard interval information.

16. The method according to claim 15, wherein
the first symbol quantity comprises a quantity of guard symbols during switching from a DU uplink symbol to an MT uplink symbol, a quantity of guard symbols during switching from a DU uplink symbol to an MT downlink symbol, a quantity of guard symbols during switching from a DU uplink symbol to an MT downlink symbol, and a quantity of guard symbols during switching from a DU downlink symbol to an MT downlink symbol; and the second symbol quantity comprises a quantity of guard symbols during switching from an MT downlink symbol to a DU downlink symbol, a quantity of guard symbols during switching from an MT downlink symbol to a DU uplink symbol, a quantity of guard symbols during switching from an MT uplink symbol to a DU downlink symbol, and a quantity of guard symbols during switching from an MT uplink symbol to a DU uplink symbol.

17. The method according to claim 15, wherein the first configuration information further indicates a subcarrier spacing of the first symbol quantity and a subcarrier spacing of the second symbol quantity.

18. The method according to claim 15, further comprising receiving, by the first node, second guard interval information reported by the second node, wherein the second guard interval information comprises a third symbol quantity and a fourth symbol quantity, the third symbol quantity being a quantity of guard symbols during switching from the first resource to the second resource, and the fourth symbol quantity being a quantity of guard symbols during switching from the second resource to the first resource, wherein:

the third symbol quantity comprises a quantity of guard symbols during switching from a DU uplink symbol to an MT uplink symbol, a quantity of guard symbols during switching from a DU uplink symbol to an MT downlink symbol, a quantity of guard symbols during switching from a DU uplink symbol to an MT downlink symbol, and a quantity of guard symbols during switching from a DU downlink symbol to an MT downlink symbol; and the fourth symbol quantity comprises a quantity of guard symbols during switching from an MT downlink symbol to a DU downlink symbol, a quantity of guard symbols during switching from an MT downlink symbol to a DU uplink symbol, a quantity of guard symbols during switching from an MT uplink symbol to a DU downlink symbol, and a quantity of guard symbols during switching from an MT uplink symbol to a DU uplink symbol.

19. The method according to claim 18, wherein there are one or more sets of second guard interval information, and each set of second guard interval information of the one or more sets of second guard interval information corresponds to one subcarrier spacing of one or more subcarrier spacings.

20. A communications apparatus, comprising
a transceiver;
a processor;
a non-transitory computer-readable medium storing a computer program for execution, by the processor, the computer program including instructions to:
receive, via the transceiver, first configuration information sent by a first node, wherein:
the first configuration information indicates first guard interval information;
the first guard interval information comprises a first symbol quantity and a second symbol quantity, the first symbol quantity being a quantity of guard symbols during switching from a first resource to a second resource, the second symbol quantity being a quantity of guard symbols during switching from the second resource to the first resource;
the first resource is a distributed unit (DU) resource and the second resource is a mobile terminal (MT) resource; and
the first node is a parent node or a donor node of the communications apparatus; and
determine a time domain position of the second resource based on a time domain position of the first resource and the first guard interval information.

* * * * *